US011849532B1

(12) United States Patent
Roper

(10) Patent No.: US 11,849,532 B1
(45) Date of Patent: Dec. 19, 2023

(54) ELECTROCHEMICAL ATOM VAPOR SOURCE AND/OR SINK WITH INTEGRATED HEATER

(71) Applicant: HRL Laboratories, LLC, Malibu, CA (US)

(72) Inventor: Christopher S Roper, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 162 days.

(21) Appl. No.: 17/560,371

(22) Filed: Dec. 23, 2021

Related U.S. Application Data

(63) Continuation of application No. 16/573,684, filed on Sep. 17, 2019.

(Continued)

(51) Int. Cl.
  *H05H 3/02*     (2006.01)
  *G04F 5/14*     (2006.01)
  *G01N 27/407*   (2006.01)

(52) U.S. Cl.
  CPC ........... *H05H 3/02* (2013.01); *G01N 27/4071* (2013.01); *G01N 27/4074* (2013.01); *G04F 5/14* (2013.01)

(58) Field of Classification Search
  None
  See application file for complete search history.

(56) References Cited

U.S. PATENT DOCUMENTS

| 3,578,834 A | 5/1971 | Porta et al. |
| 4,495,478 A | 1/1985 | Kwon et al. |

(Continued)

FOREIGN PATENT DOCUMENTS

| WO | 1997012298 A1 | 4/1997 |
| WO | 2000043842 A2 | 2/2001 |

OTHER PUBLICATIONS

Svenja Knappe, MEMS Atomic Clocks, National Institute of Standards and Technology (NIST), Boulder, Co, USA Published by Elsevier B.V., Comprehensive Microsystems, vol. 3, pp. 571-612, Nov. 2007.

(Continued)

*Primary Examiner* — Andrew Smyth
(74) *Attorney, Agent, or Firm* — O'Connor & Company; Ryan P. O'Connor

(57) ABSTRACT

Some variations provide an atom vapor-density control system, the system comprising: a first electrode; a second electrode that is electrically isolated from the first electrode; an ion-conducting layer interposed between the first electrode and the second electrode, wherein the ion-conducting layer is in ionic communication with the second electrode; at least one atom reservoir in contact with the second electrode or with an additional electrode, wherein the atom reservoir is electrochemically configured to controllably supply or receive atoms; a heater in thermal communication with a heated region comprising the first electrode; and one or more thermal isolation structures configured to minimize heat loss out of the heated region into a cold region. Several exemplary system configurations are presented in the drawings. The disclosed atom vapor-density control systems are capable of controlling the vapor pressure of metal atoms (such as alkali atoms) at low electrical power input.

20 Claims, 11 Drawing Sheets

Related U.S. Application Data

(60) Provisional application No. 62/773,236, filed on Nov. 30, 2018.

(56) References Cited

U.S. PATENT DOCUMENTS

| | | | |
|---|---|---|---|
| 5,192,921 | A | 3/1993 | Chantry et al. |
| 7,126,112 | B2 | 10/2006 | Anderson et al. |
| 3,009,520 | A1 | 8/2011 | Jau et al. |
| 8,258,884 | B2 | 9/2012 | Borwick, III et al. |
| 8,624,682 | B2 | 1/2014 | Ridley et al. |
| 8,999,123 | B2 | 4/2015 | Bernstein et al. |
| 9,064,942 | B2 | 6/2015 | Bangsaruntip et al. |
| 9,077,354 | B2 | 7/2015 | Strabley et al. |
| 9,685,483 | B2 | 6/2017 | Nazarian et al. |
| 9,763,314 | B1 * | 9/2017 | Roper ............ H05H 3/02 |
| 9,837,177 | B1 | 12/2017 | Roper et al. |
| 10,056,913 | B1 | 8/2018 | Roper et al. |
| 10,545,461 | B1 | 1/2020 | Roper et al. |
| 10,775,748 | B1 | 9/2020 | Roper et al. |
| 10,828,618 | B1 | 11/2020 | Roper et al. |
| 11,101,809 | B1 | 8/2021 | Roper |
| 2005/0220683 | A1 * | 10/2005 | McLean ............ B01J 19/0093 422/606 |
| 2011/0247942 | A1 | 10/2011 | Bernstein et al. |
| 2014/0227548 | A1 | 8/2014 | Myrick |
| 2015/0226669 | A1 | 8/2015 | Compton |

OTHER PUBLICATIONS

Jonathan J. Bernstein et al., "All Solid-State Ion-Conducting Cesium Source for Atomic Clocks," Solid State Ionics, vol. 198, No. 1, Sep. 2011.

Bernstein et al., "Solid State Electrochemical Alkali Sources for Cold Atom Sensing", Solid-State Sensors, Actuators and Microsystems Workshop, Hilton Head Island, South Carolina, Jun. 5-9, 2016.

Wan et al., "Study on the First-Principles Calculations of Graphite Intercalated by Alkali Metal (Li, Na, K)", Int. J. Electrochem. Sci., 10 (Feb. 24, 2015) 3177-3184.

* cited by examiner

ELECTROCHEMICAL ATOM VAPOR SOURCE AND/OR SINK WITH INTEGRATED HEATER

PRIORITY DATA

This patent application is a continuation application of U.S. patent application Ser. No. 16/573,684, filed on Sep. 17, 2019, which is a non-provisional application with priority to U.S. Provisional Patent App. No. 62/773,236, filed on Nov. 30, 2018, each of which is hereby incorporated by reference herein.

STATEMENT REGARDING FEDERALLY SPONSORED RESEARCH OR DEVELOPMENT

This invention was made with Government support under Contract No. N66001-15-C-4027 awarded by DARPA. The Government has certain rights in this invention.

FIELD OF THE INVENTION

The present invention generally relates to alkali and alkaline earth vapor cells, systems containing vapor cells, and methods of using vapor cells.

BACKGROUND OF THE INVENTION

Atom sources have importance for many applications, including (but not limited to) vapor cells. Alkali vapor cells have been used extensively since the 1960s in the study of light-atom interactions. The ability to control the vapor pressure of alkali atoms has multiple applications, mainly related to atomic physics.

Atom-source systems, both proposed and realized, include cold atom systems, atomic clocks, communication system switches and buffers, single-photon generators and detectors, gas-phase sensors, nonlinear frequency generators, precision spectroscopy instrumentation, accelerometers, and gyroscopes. However, most of these applications have only been created in laboratory settings.

Macroscale vapor cells are widely used in macroscale atomic clocks and as spectroscopy references. Macroscale vapor cells are typically 10-100 $cm^3$ in volume, which is insignificant for $m^3$ scale atomic clocks, but far too large for chip-scale atomic clocks.

A key driver has thus been to reduce vapor-cell size. Traditional vapor-cell systems are large and, if they have thermal control, have many discrete components and consume a large amount of power. To realize the full potential of vapor-cell technologies, the vapor-cell systems need to be miniaturized.

Chip-scale atomic clocks and navigation systems require miniature vapor cells, typically containing cesium or rubidium, with narrow absorption peaks that are stable over time. Miniature vapor cells, and methods of filling them with alkali metals, have been described in the prior art. However, it has proven difficult to load a precise amount of alkali metal into a miniature vapor cell through the methods described in the literature. Miniature vapor cells have higher surface-area-to-volume ratios than macroscale vapor cells, and are more difficult to load than macroscale vapor cells.

Traditionally, alkali metals have been introduced into magneto-optical trap (MOT) vacuum systems via difficult-to-control preparation steps, such as manually crushing a sealed alkali-containing glass ampule inside a metal tube connected to the vacuum system via a control valve. See Wieman, *American Journal of Physics* vol. 63, no. 4, p. 317, 1995. This approach requires external heating to replenish the alkali metal inside the vacuum system as needed, which is a slow process with little control over the amount of alkali metal delivered. The manual labor is non-ideal for automated systems or chip-scale devices.

An alternative exists in the now-common alkali metal dispensers, which are effectively an oven-controlled source of alkali metal, whereby the desired alkali metal is released by chemical reaction when a current is passed through the device. While this process automates the release of alkali metal into the vacuum system, it has difficulty in fabrication compatibility with chip-scale cold-atom devices. Further, the timescales required for generating (warm up) and sinking (pump down) alkali are typically on the order of seconds to minutes, and can vary greatly depending on the amount of alkali metal built up on the vacuum system walls.

A rapidly pulsed and cooled variant of the alkali metal dispenser has been developed to stabilize the residual Rb vapor pressure in 100 millisecond pump-down time, but the device requires large-dimension Cu heat sinks and complicated thermal design (Dugrain, *Review of Scientific Instruments* vol. 85, no. 8, p. 083112, August 2014) which may not easily translate to miniaturization.

Double MOTs wherein the first MOT is loaded at moderate vacuum, and then an atom cloud is transferred to a second high-vacuum MOT, have been implemented on the laboratory scale. Again, these systems require complicated dual-vacuum systems and controls as well as a transfer system to move the atom cloud from one MOT to the other, none of which is amenable to chip-scale integration.

Light-induced atomic desorption (LIAD) is a recent technique that solves some of the long pump-down times by only releasing a small amount of alkali using a desorption laser; however, this method requires preparing a special desorption target in the MOT vacuum chamber. The desorption laser can interfere with the trapping lasers of the MOT (see Anderson et al., *Physical Review A* vol. 63, no. 2, Jan. 2001). It also has yet to demonstrate suitable time constants below 1 second.

A laser can be used to generate alkaline earth metal atoms from an alkaline earth metal oxide; however, this technique requires the added complexity of an additional laser and is not bidirectional. See Kock et al., "Laser controlled atom source for optical clocks" *Scientific Reports* 6, Article number: 37321 (2016).

Bernstein et al. have developed a solid-state ionic concept based on cesium (Cs) conducting glass; see U.S. Pat. No. 8,999,123 and U.S. Patent App. Pub. No. 2011/0247942. However, this technology has drawbacks. For example, the Cs conducting glass has very low ion conductivity. The implications of this are shown in Bernstein et al., "All solid state ion-conducting cesium source for atomic clocks," *Solid State Ionics* Volume 198, Issue 1, 19 Sep. 2011, Pages 47-49, in which >1000 V applied voltage and elevated temperature (~170° C.) are required to change the alkali content on time scales of ~100 seconds.

What is instead desired is to work with much lower voltages (such as 1-100 V) and faster time response than 100 seconds. Cold atom lifetime is typically up to several seconds. The excess atoms should therefore be removed from the vapor chamber on response time scales <1 second in order to have a significant effect on the cold atom lifetime. In some applications, removing atoms from vapor cells on longer time scales is acceptable.

In Bernstein et al., "SOLID STATE ELECTROCHEMICAL ALKALI SOURCES FOR COLD ATOM SENSING,"

Solid-State Sensors, Actuators and Microsystems Workshop, South Carolina, June 2016 (pages 180-184), inert Pt electrodes with 130 V applied voltage are used to reduce Rb vapor pressure using Rb-beta-alumina. This is a high required voltage and may cause electrolysis of absorbed water, emitting oxygen into the chamber. Furthermore, the backside electrodes contain a metal that is ionized and injected into the solid electrolyte (e.g. Ag) that is different from the desired atoms in the vapor phase of the vapor cell (e.g. Cs or Rb). This contaminates the solid electrolyte and limits the usable lifetime for the device.

There is also a long-felt need for operation of cold atom systems at elevated temperatures. It has long been desirable to operate cold atoms systems at elevated temperature for precise timing and navigation applications, but high equilibrium vapor pressure at elevated temperatures leads to short lifetimes of cold atoms (such as less than 1 millisecond), which reduces the stability of the measurement by orders of magnitude. There is also a long-felt need for operation of cold atom systems at low power inputs. To date, there are no electrically controllable, bidirectional metal-atom sources that are both fast (<1 second) and can be operated at low power (<100 mW).

SUMMARY OF THE INVENTION

The present invention addresses the aforementioned needs in the art, as will now be summarized and then further described in detail below.

Some variations provide an atom vapor-density control system, the system comprising:
- a first electrode;
- a second electrode that is electrically isolated from the first electrode;
- an ion-conducting layer interposed between the first electrode and the second electrode, wherein the ion-conducting layer is in ionic communication with the second electrode;
- at least one atom reservoir in ionic communication with the ion-conducting layer, wherein the atom reservoir is electrochemically configured to controllably supply or receive atoms;
- a heater in thermal communication with a heated region comprising the first electrode; and
- one or more thermal isolation structures configured to minimize heat loss out of the heated region into a cold region.

The first and second electrodes may be metal grids (e.g., platinum mesh) with spacing less than 10 microns or less than 1 micron, for example.

In some embodiments, the ion-conducting layer is ionically conductive for at least one ionic species selected from the group consisting of $Rb^+$, $Cs^+$, $Ca^{2+}$, $Na^+$, $K^+$, $Sr^{2+}$, and $Yb^{3+}$. The ion-conducting layer may comprise a material selected from the group consisting of β-alumina, β"-alumina, and combinations thereof, for example.

In some embodiments, the atom reservoir is in contact with the second electrode.

In some embodiments, the atom reservoir contains an intercalable compound, such as a carbonaceous material selected from the group consisting of graphite, graphene, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof. The intercalable compound is capable of intercalating one or more atoms (e.g., Rb, Cs, Ca, Na, K, or Sr) to contain them in the atom reservoir.

In some embodiments, the heated region further comprises the second electrode, at least a portion of the ion-conducting layer, or both the second electrode and at least a portion of the ion-conducting layer. The heater may be a resistive heater, such as a thin-film resistive heater. The atom vapor-density control system may include a temperature sensor, such as (but not limited to) a resistance temperature detector (RTD). In some embodiments, the temperature sensor is patterned on the same layer (e.g., a thermal isolation structure) that contains (e.g., is patterned with) the heater.

The thermal isolation structures may contain a material selected from polymers, ceramics, glasses, metals, or a combination thereof. In some embodiments, the thermal isolation structures contain a material selected from the group consisting of β-alumina, β"-alumina, α-alumina, silica, quartz, borosilicate glass, silicon, silicon nitride, silicon carbide, mica, polyimide, and combinations thereof.

In some embodiments, the thermal isolation structures include at least one solid beam that isolates the heated region from the cold region. The solid beam may be a straight beam, a folded beam, or another type of beam.

In some embodiments, at least one of the thermal isolation structures is integrated into a layer of the atom vapor-density control system. That layer may be the ion-conducting layer, for example, or another layer within the device.

In certain embodiments, at least one of the thermal isolation structures forms a wall of the atom reservoir.

At least one of the thermal isolation structures may mechanically suspend part of the device (e.g., the first electrode) above a substrate. In some embodiments, at least one of the thermal isolation structures mechanically suspends the first electrode, the second electrode, the ion-conducting layer, and the atom reservoir above a substrate. A thermal isolation structure may be mechanically connected to a base substrate through a frame or by other means.

In some embodiments, the heater is a thin-film resistive heater with electrical connections that are patterned on at least one of the thermal isolation structures. Alternatively, or additionally, a thin-film resistive heater may be directly patterned on at least one of the thermal isolation structures.

In some embodiments, the thermal isolation structures are characterized by an average thermal resistance of at least 100 K/W, or at least 1000 K/W.

In some embodiments, the thermal isolation structures include a vacuum space or vapor space surrounding at least a portion of the heated region. The vapor space may contain atoms derived from the atom reservoir and/or an inert gas, for example. In other embodiments, the thermal isolation structures include a liquid or solid thermal insulator (e.g., an aerogel) surrounding at least a portion of the heated region.

The atom vapor-density control system may be disposed within a vapor-cell system comprising a vapor-cell region configured to allow at least one optical path into a vapor phase within the vapor-cell region.

Some variations provide a method of operating an atom vapor-density control system, the method comprising:
(a) providing an atom vapor-density control system including (i) a first electrode; (ii) a second electrode that is electrically isolated from the first electrode; (iii) an ion-conducting layer interposed between the first electrode and the second electrode, wherein the ion-conducting layer is in ionic communication with the second electrode; (iv) at least one atom reservoir in ionic communication with the ion-conducting layer, wherein the atom reservoir is electrochemically configured to controllably supply or receive atoms; (v) a heater in thermal communication with a heated region comprising the first electrode; and (vi) one or more thermal isolation structures configured to minimize heat loss out of the heated region into a cold region;

(b) providing an atom-vapor apparatus selected from the group consisting of a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, and an atom dispenser system, wherein the atom-vapor apparatus is configured with the atom vapor-density control system;

(c) with the heater, heating the heating region of the atom vapor-density control system; and (d) applying a voltage between the first electrode and the second electrode, thereby adjusting atom vapor density within the atom-vapor apparatus.

In some embodiments, a voltage is applied between the first and second electrodes to reduce the atom vapor density in a vapor-cell region (e.g., evacuate alkali atoms from a vapor cell). The voltage may be applied such the second electrode has a lower electrical potential than the first electrode.

In some embodiments, a population of cold atoms (e.g., $10^5$ to $10^9$ atoms) at a temperature of, for example, about 1 μK to 1000 μK, may be prepared within a vapor-cell region prior to applying a voltage between the first and second electrodes to reduce the atom vapor density in a vapor-cell region. This population may be formed with a magneto-optical trap.

The response time (for sourcing and/or sinking metal atoms) of the system is preferably less than about 10 seconds, more preferably less than about 1 second, and most preferably less than about 0.1 second. In various embodiments, the system response time is about 1, 0.5, 0.2, 0.1, 0.05, 0.04, 0.03, 0.02, or 0.01 seconds.

The system power input for sourcing and/or sinking metal atoms is preferably less than about 500 mW, more preferably less than about 200 mW, and most preferably less than about 100 mW. In various embodiments, the system power input for sourcing and/or sinking metal atoms is about 500 mW, 400 mW, 300 mW, 200 mW, 100 mW, 75 mW, 50 mW, 25 mW, or 10 mW, or less.

A voltage (e.g., from about 0.01 V to about 100 V) may be applied between the first and second electrodes to increase the atom vapor density in a vapor-cell region prior to preparing a population of cold atoms within the vapor-cell region. In various embodiments, the applied voltage is about 10 mV, 25 mV, 50 mV, 100 mV, 200 mV, 300 mV, 400 mV, or 450 mV, or about 0.5 V, 1 V, 5 V, 10 V, 20 V, 50 V, 75 V, or 100 V. The voltage may be applied such the second electrode has a higher electrical potential than the first electrode.

DETAILED DESCRIPTION OF EMBODIMENTS OF THE INVENTION

Figure 1:
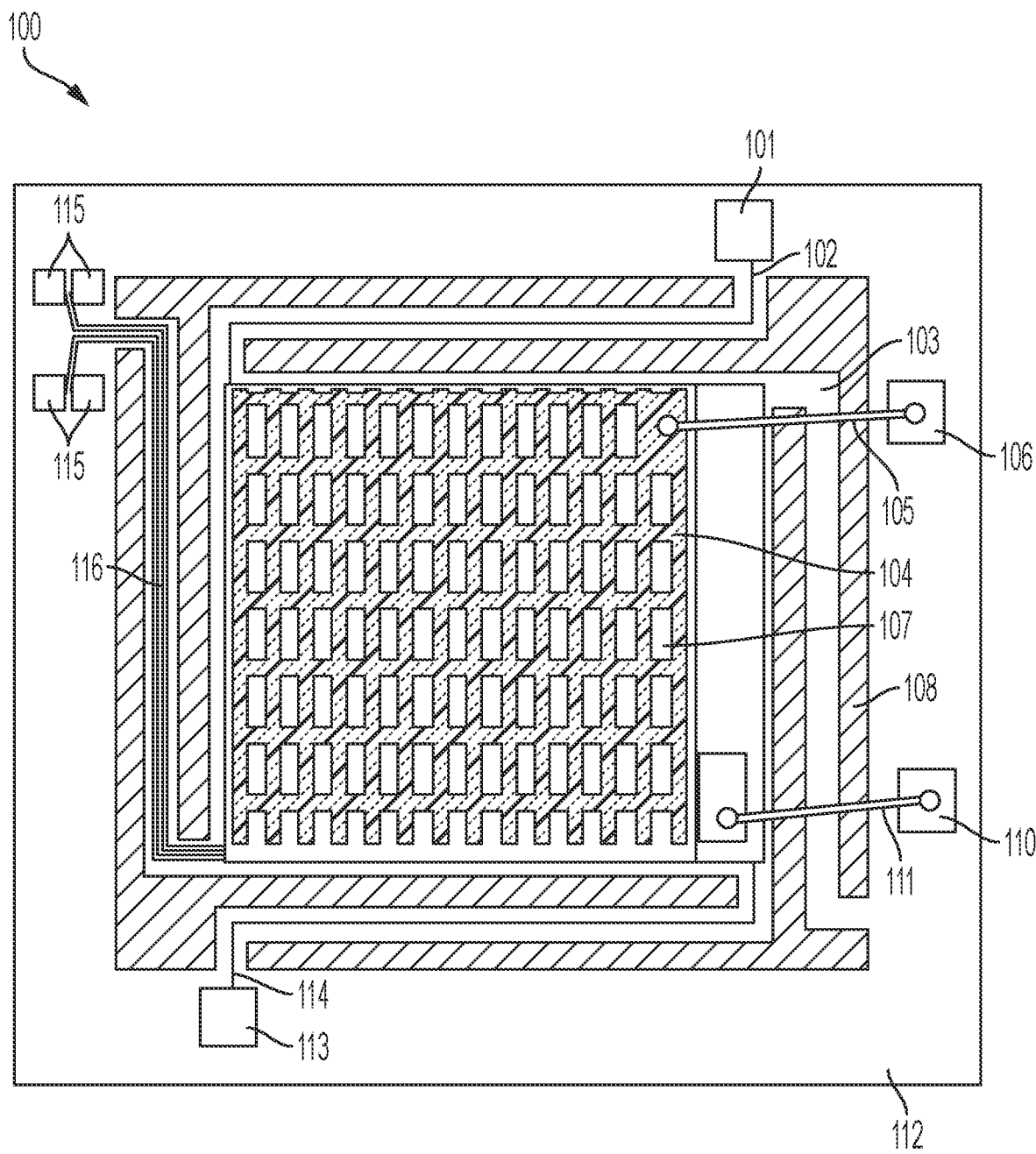
FIG. 1 is a plan-view schematic of an atom vapor-density control system with separate ionic conductor, reservoir wall, and thermal isolation structures, in some embodiments.

The systems (devices) and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide an atom vapor-density control system comprising a solid-state electrochemical device for controlling atom vapor pressure (e.g., alkali metal or alkaline earth metal vapor pressure). The solid-state electrochemical device is integrated with a thermal control device including a thermal isolation structure, enabling faster vapor pressure control by increasing the evaporation flux, allowing use of the system with high-vapor-pressure metals such as Ca and Sr, and reducing the heater power required. Electrical inputs enable controlled dosing of metal atoms (e.g., alkali atoms) into and out of an atom vapor-density control system.

Recent research has demonstrated solid-state electrochemical devices that can modulate alkali vapor pressure at 50 Hz. These devices can be configured to operate with ~10 mW power to the electrical part, but require ~100 mW or more power to run an attached heater. Integration of a microfabricated heater and thermal isolation structure, as disclosed in this specification, reduces power consumption to heat the device by at least an order of magnitude, in preferred embodiments. Low power consumption is especially important for portable atomic instruments, for example.

The ability to control the vapor pressure of alkali atoms can enable long population lifetimes (e.g., 1-10 seconds) of cold atoms, particularly in miniaturized atomic systems. Cold atoms (such as at temperatures of about 1 µK to about 1 K, typically from about 100 µK to about 1000 µK) are useful for precision timing and navigation applications. In certain applications, cold atoms can be made that are in the 100 nanokelvin range or even less ($\leq 10^{-7}$ K).

Cold atoms are typically formed from a subset of warmer atoms inside a vapor cell, e.g. through trapping and cooling in a magneto-optical trap (MOT). The time constant of the cold-atom population depends on the density of other atoms in the vapor cell because of collisional heating. For fast loading (i.e. short time constant on loading, e.g. less than 1 second, preferably less than 0.1 seconds, and more preferably less than 10 milliseconds), it is desirable to have a high vapor density of atoms. However, for highly stable and highly precise measurement, it is desirable to have the population of cold atoms last as long as possible. Therefore it is desirable to have a long time constant (e.g., greater than 1 second) and low vapor density once the population of cold atoms has been cooled and trapped. The active control of the vapor density in a vapor cell, provided in this patent application, enables a fast loading time as well as a long lifetime.

In some embodiments or system states in which high vapor density is desirable, the density of metal atoms may be at least $10^9$ atoms per cm$^3$, preferably at least $10^{10}$ per cm$^3$, and more preferably at least $10^{11}$ per cm$^3$. In some embodiments or system states in which low vapor density is desirable, the density of metal atoms may be below $10^8$ atoms per cm$^3$, preferably below $10^7$ atoms per cm$^3$. In various embodiments, the density of metal atoms if about, at least about, or at most about $10^6$ atoms per cm$^3$, 107 atoms per cm$^3$, $10^8$ atoms per cm$^3$, 109 atoms per cm$^3$, $10^{10}$ atoms per cm$^3$, $10^{11}$ atoms per cm$^3$, or $10^{12}$ atoms per cm$^3$.

Additionally, the ability to source alkali atoms with low power and with the emission of no other chemical species is desirable. Conventional alkali dispenser sources (e.g., Societá Apparecchi Electrici e Scientifici (SAES) Getters, Milan, Italy) require high currents ($\geq 5$ A is typical) and high power ($>1$ W is typical). For portable battery-powered atomic clock applications, a power budget of watts will yield device lifetimes so short as to be impractical. Furthermore, alkali dispenser sources emit non-alkali gases in their initial period of operation. For a system connected to a vacuum pump, this is often not a concern. However, for portable atomic physics systems that are infrequently or never serviced, non-alkali gases can shift or broaden the atomic transition frequency and/or increase the vapor cell pressure high enough to prevent the formation of a population of cold atoms.

This invention builds on existing HRL Laboratories inventions which enable bidirectional control of alkali metal and alkaline earth metal vapor pressure within a vapor cell. As taught herein, a significant reduction in heater power consumption can be realized through the incorporation of microfabricated thermal isolation structure(s). Thermal isolation structures provide a high thermal resistance between the heated device and the ambient temperature. Furthermore, thermal isolation structures can be made from, or part of, one or more of the solid-state electrochemical device layers (e.g., the solid-state electrolyte or the reservoir wall), thereby enabling further reduction in power. Close integration of the heater and device also enables reductions in overall size.

As intended herein, an "atom vapor-density control system" is a system arranged to supply multiple cold atoms within a device or confined region for the purposes of one or more measurements based on those atoms. Note that "measurements" shall be broadly construed to include any application (i.e., system, device, or method) which utilizes or is capable of utilizing an atomic vapor or one or more clouds of atoms.

The atom vapor-density control system may be, or be contained within, a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, or an atom dispenser system, for example. The present invention is expressly not limited to vapor cells.

The atom vapor-density control system may provide a source of atoms, a sink of atoms, or both of these. A "source," "sink," "source and/or sink", "source/sink" or the like may be used herein to refer to a source of metal atoms; a sink of metal atoms; or a material or structure that acts as either a source or sink of metal atoms, depending on local conditions (e.g., temperature, pressure, or electrical potential), concentrations of species, etc.

Some variations provide an atom vapor-density control system, the system comprising:
a first electrode;
a second electrode that is electrically isolated from the first electrode; an ion-conducting layer interposed between the first electrode and the second electrode, wherein the ion-conducting layer is in ionic communication with the second electrode;
at least one atom reservoir in ionic communication with the ion-conducting layer, wherein the atom reservoir is electrochemically configured to controllably supply or receive atoms;
a heater in thermal communication with a heated region comprising the first electrode or situated near the first electrode such that the first electrode may be heated through heat transfer from the heater; and one or more thermal isolation structures configured to minimize heat loss out of the heated region into a cold region.

The first and second electrodes may be metal grids (e.g., platinum mesh) with spacing less than 10 microns or less than 1 micron, for example. The spacing here refers to the length between adjacent electrode lines or regions in one direction. The length in the orthogonal direction may be much larger. As an example, in certain embodiments, an electrode metal grid has a unit cell grid with 1 micron spacing between metal in one direction and 100 microns between metal in the other direction, forming rectangular grid openings.

In some embodiments, the ion-conducting layer is ionically conductive for at least one ionic species selected from the group consisting of $Rb^+$, $Cs^+$, $Ca^{2+}$, $Na^+$, $K^+$, $Sr^{2+}$, and $Yb^{3+}$. The ion-conducting layer may comprise a material selected from the group consisting of β-alumina, β"-alumina, and combinations thereof, for example.

In some embodiments, the atom reservoir contains an intercalable compound, such as a carbonaceous material selected from the group consisting of graphite, graphene, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof. The intercalable compound is capable of intercalating one or more atoms (e.g., Rb, Cs, Ca, Na, K, Sr, and/or Yb) to contain them in the atom reservoir.

In some embodiments, the heated region further comprises the second electrode, at least a portion of the ion-conducting layer, or both the second electrode and at least a portion of the ion-conducting layer. The heater may be a resistive heater, such as a thin-film resistive heater. The heater may be referred to as a hotplate.

The atom vapor-density control system may include a temperature sensor, such as (but not limited to) a resistance temperature detector (RTD). In some embodiments, the temperature sensor is patterned on the same layer (e.g., a thermal isolation structure) that contains (e.g., is patterned with) the heater.

The thermal isolation structures may contain a material selected from polymers, ceramics, glasses, metals, or a combination thereof. In some embodiments, the thermal isolation structures contain a material selected from the group consisting of β-alumina, β"-alumina, α-alumina, silica, quartz, borosilicate glass, silicon, silicon nitride, silicon carbide, mica, polyimide, and combinations thereof.

In some embodiments, the thermal isolation structures include at least one solid beam that isolates the heated region from the cold region. The solid beam may be a straight beam, a folded beam, or another type of beam.

In some embodiments, at least one of the thermal isolation structures is integrated into a layer of the atom vapor-density control system. That layer may be the ion-conducting layer, for example, or another layer within the device.

In certain embodiments, at least one of the thermal isolation structures forms a wall of the atom reservoir.

At least one of the thermal isolation structures may mechanically suspend part of the device (e.g., the first electrode) above a substrate. In some embodiments, at least one of the thermal isolation structures mechanically suspends the first electrode, the second electrode, the ion-conducting layer, and the atom reservoir above a substrate. A thermal isolation structure may be mechanically connected to a base substrate through a frame or by other means.

The substrate may be fabricated from silicon, $SiO_2$, fused silica, quartz, pyrex, metals, dielectrics, or a combination thereof, for example.

In some embodiments, the heater is a thin-film resistive heater with electrical connections that are patterned on at least one of the thermal isolation structures. Alternatively, or additionally, a thin-film resistive heater may be directly patterned on at least one of the thermal isolation structures.

In some embodiments, the thermal isolation structures are characterized by an average thermal resistance of at least 100 K/W, or at least 1000 K/W.

In some embodiments, the thermal isolation structures include a vacuum space or vapor space surrounding at least a portion of the heated region. The vapor space may contain atoms derived from the atom reservoir and/or an inert gas, for example. In other embodiments, the thermal isolation structures include a liquid or solid thermal insulator (e.g., an aerogel) surrounding at least a portion of the heated region.

The atom vapor-density control system may be disposed within a vapor-cell system comprising a vapor-cell region configured to allow at least one optical path into a vapor phase within the vapor-cell region.

Various aspects and embodiments of the invention will now be further described, without limitation.

The ion-conducting layer, or "ionic conductor," preferably has high ionic conductivity for one or more ionic species. The ionic species is preferably an ionized form of an atom of interest in atomic physics and atomic measurement instruments. The ionic species may be an alkali metal ion or an alkaline earth metal ion. Alkali metals include Li, Na, K, Cs, Rb, and Fr. Alkaline earth metal include Be, Mg, Ca, Sr, Ba, and Ra. In some embodiments, the ionic species is one or more of $Na^+$, $K^+$, $Rb^+$, $Cs^+$, $Sr^{2+}$, $Yb^{3+}$, or $Ca^{2+}$. The ionic species may be $Hg^{2+}$, or that of any other metal, in other embodiments. The ionic conductivity of the ion-conducting layer, measured at 25° C., is preferably about $10^{-9}$ S/cm or higher, more preferably about $10^{-7}$ S/cm or higher, or about $10^{-5}$ S/cm or higher. In various embodiments, the ionic conductivity of the ion-conducting layer at 25° C. is about $10^{-8}$ S/cm, $10^{-7}$ S/cm, $10^{-6}$ S/cm, $10^{-5}$ S/cm, $10^{-4}$ S/cm, $10^{-3}$ S/cm, or $10^{-2}$ S/cm.

By "ionic communication" between the ion-conducting layer and the second electrode, it is meant that ions, or their neutral forms, are capable of being transported between the ion-conducting layer and the second electrode. Note that in some embodiments, ions (i.e. positively or negatively charged atoms) may be neutralized at the interface between the ion-conducting layer and the second electrode, so that ions (e.g., as $Rb^+$ or $Na^+$) do not leave the ion-conducting layer. In these embodiments, neutralized forms of the ions (e.g., Rb or Na) are transported away from the ion-conducting layer.

The ionic conductor preferably comprises or consists essentially of a solid electrolyte. For example, the ionic conductor may include a large fraction (e.g., at least 50 wt %) β-alumina, β"-alumina, or a combination thereof. In some embodiments employing β"-alumina, the ionic conductor when loaded with metal ions contains Na-β"-alumina, K-β"-alumina, Rb-β"-alumina, Cs-β"-alumina, Sr-β"-alumina, Ca-β"-alumina, or a combination thereof.

β-alumina and β"-alumina are good conductors of their mobile ions yet allows negligible non-ionic (i.e., electronic) conductivity. β"-alumina is a hard polycrystalline or monocrystalline ceramic which, when prepared as an electrolyte, may be complexed with a mobile ion, such as $Rb^+$, $Cs^+$, $Ca^{2+}$, $Na^+$, $K^+$, $Sr^{2+}$, and/or $Yb^{3+}$. β-alumina and/or β"-alumina are also referred to herein as "beta-alumina." Beta-alumina solid electrolyte is a fast ion-conductor material used as a membrane in several types of electrochemical cells.

Alternative ionic conductors include, but are not limited to, NASICON, LISICON, KSICON, yttria-stabilized zirconia, alkali ion-exchanged versions of the foregoing, and combinations thereof. Ionic conductors may alternatively, or additionally, include chalcogenide glasses, such as $RbI$—$GeSe_2$—$Ga_2Ge_3$ and/or $CsI$—$GeSe_2$—$Ga_2Ge_3$.

At least one first electrode is included in the system. The first electrode is in contact with the ionic conductor and permits the conduction of electrons. In some embodiments, the first electrode permits the conduction of the same ionic species as in the ionic conductor and/or permits the diffusion of a reduced form of the same ionic species as in the ionic conductor. In some embodiments, the first electrode is patterned to permit direct evaporation (such as ballistic transport) of the reduced form of the ionic species from an exposed surface of the ionic conductor.

In some embodiments, the first electrode is in contact with both the ion-conducting layer and a vapor chamber volume. Both the first electrode and the ion-conducting layer may form part of the inner walls of the vapor chamber. The first electrode preferably has a high diffusivity for alkali and/or alkaline earth metal atoms (or other atoms in the vapor cell). The atoms in the atomic vapor have a diffusivity in the first electrode that is preferably at least $10^{-10}$ $cm^2/s$ and more preferably at least $10^{-6}$ $cm^2/s$ at the device operation temperature (e.g., 25° C.). In various embodiments, atoms in the atomic vapor have a diffusivity in the first electrode of about $10^{-8}$ $cm^2/s$, $10^{-7}$ $cm^2/s$, $10^{-6}$ $cm^2/s$, $10^{-5}$ $cm^2/s$, $10^{-4}$ $cm^2/s$, or higher.

The first electrode may be a porous electrically conductive structure, a selectively permeable and electrically conductive layer, or a mixed ion-electron conductor, for example. A porous first electrode is preferable, in some embodiments, over a mixed ion-electron conductor electrode or a solid thin-film electrode.

The first electrode may be a uniform layer or a non-uniform layer. The thickness of the first electrode is preferably less than 500 m and more preferably less than 100 μm. In various embodiments, the thickness of the first electrode is about 1 nm, 10 nm, 100 nm, 1 m, 10 m, 100 m, 500 m, or more.

The first electrode may be designed to have a high amount of three-phase contact length or interfacial contact area. The three phases are electrode, ionic conductor, and atomic vapor. A high amount of three-phase contact is considered to be at least 2 $\mu m/\mu m^2$ (contact length per total interfacial surface area measured by adsorption isotherm), preferably at least 5 $\mu m/\mu m^2$, more preferably at least 10 $\mu m/\mu m^2$, and most preferably at least 20 $\mu m/\mu m^2$. Configurations that may accomplish high three-phase contact include a high-density mesh or grid pattern, a porous material with an open porosity, a high-density parallel line pattern, or a nanowire array, for example. In some embodiments, an electrode is in the form of a solid film, not a porous film with holes or openings.

The first electrode is preferably a porous electrically conductive layer, which may be an electrically conductive, patterned metal layer directly on a surface of the ionic conductor, for example. The metal layer is preferably thin, such as less than 1 micron, preferably less than 200 nm, and more preferably less than 100 nm. The metal layer preferably is patterned in a closely spaced configuration, such as less than 100 micron line pitch, preferably less than 10 micron line pitch, and more preferably less than 2 micron line pitch. The metal layer may be patterned with photolithography, electron-beam lithography, direct-write lithography, direct-write metal deposition (e.g. ion beam-induced deposition), interference lithography, or another technique.

The porous electrically conductive layer (first electrode) preferably does not chemically interact with the ionic species. In some embodiments, the porous electrically conductive layer does not form an intermetallic phase and does not chemically react with the ionic species other than enabling electrochemical oxidation and reduction. The porous electrically conductive layer also preferably does not chemically interact with the ionic conductor, other than possible chemical bonding to adhere to the ionic conductor. It is preferred that portions of the first electrode cannot form mobile ions within the ionic conductor.

The first electrode may have a high diffusivity for alkali metal atoms and/or alkaline earth metal atoms. In some embodiments, the atom diffusivity in the first electrode is preferably at least $10^{-10}$ $cm^2/s$ and more preferably at least $10^{-6}$ $cm^2/s$ at the device operation temperature, such as 25° C. or 100° C.

The first electrode is at least a fair electrical conductor. In some embodiments, the electrical resistivity of the first electrode is preferably less than 10 kΩ·cm, more preferably less than 1 kΩ·cm, and most preferably less than 1 Ω·cm.

The first electrode may be fabricated from common electrode materials including, but not limited to, Pt, Mo, W, Ni, Cu, Fe, and Al. The first electrode may be solid or porous. The first electrode may also entail more than one layer, such as a Ti adhesion layer and a Pt layer.

In some embodiments, the first electrode comprises an intercalable material capable of forming an intercalation compound with one or more atoms selected for vapor-density control. The intercalable material is preferably graphite, and may alternatively or additionally include $MoS_2$ and/or $TaS_2$. The thickness of the intercalable material is preferably less than 100 microns and more preferably less than 10 microns. The intercalable material may be present in a uniform layer. In some embodiments, the intercalable material is present in the form of particles in a matrix, such as a polymer binder. The polymer binder (when present) preferably has low outgassing and is compatible with ultra-high vacuum. Exemplary polymer binders include polyvinylpyrrolidone, poly(methyl methacrylate), cellulose resins, fluoroelastomers, etc. Additives may be included in the matrix to increase the electrical conductivity of the electrode. Such additives may be small conductive carbon particles (e.g. Super P® carbon black).

In some embodiments, the first electrode includes a mixed ion-electron conductor material. A "mixed ion-electron conductor" means a material having both electrical conductivity greater than $10^{-10}$ S/cm, preferably greater than $10^{-6}$ S/cm, and ionic conductivity greater than $10^{-10}$ S/cm, preferably greater than $10^{-6}$ S/cm.

For example, a mixed ion-electron conductor material may be selected from the group consisting of alkali monoferrites (e.g. $RbFeO_2$, $CsFeO_2$, etc.), alkali monoaluminates (e.g. $RbAlO_2$, $CsAlO_2$, etc.), alkali monogallates (e.g. $RbGaO_2$, $CsGaO_2$, etc.), and combinations thereof. Any of these alkali monoferrites, alkali monoalluminates, or alkali monogallates are optionally doped with one or more atoms selected from Pb, Cd, Ca, P, V, Nb, Ta, Si, Ti, and/or Ge, for example. Exemplary compounds for the ion-electron conductor include, but are not limited to, $Rb_{1-2x}M_xAlO_2$ (x is from 0 to less than 0.5) wherein M=Pb, Cd, and/or Ca; $Rb_{2-2x}Fe_{2-x}M_xO_4$ (x is from 0 to 1) wherein M=P, V, Nb and/or Ta; $Rb_{2-2x}Ga_{2-x}M_xO_4$ (x is from 0 to 1) wherein M=P, V, Nb and/or Ta; $Rb_{2-2x}Al_{2-x}M_xO_4$ wherein M=P, V, Nb and/or Ta; and $Rb_{1-x}Al_{1-x}M_xO_2$ (x is from 0 to less than 1) wherein M=Si, Ti, and/or Ge.

In some embodiments, a mixed ion-electron conductor material may be selected from alkali pyrophosphates, such as $Rb_4P_2O_7$. The alkali pyrophosphate is optionally doped with one or more atoms selected from Ca, Sr, Ba, Pb, Y, La, and/or Nd, for example. Exemplary compounds for the ion-electron conductor include, but are not limited to, $Rb_{4-2x}M_xP_2O_7$ (x is from 0 to less than 2) wherein M=Ca, Sr, Ba, and/or Pb; and $Rb_{3-3x}M_xPO_4$ (x is from 0 to less than 1) wherein M=Y, La, and/or Nd.

The thickness of the mixed ion-electron conductor material is preferably less than 500 microns and more preferably less than 100 microns. The mixed ion-electron conductor material may be present in a uniform layer.

The mixed ion-electron conductor material is preferably characterized by an electrical sheet resistance of less than about 10 MΩ/square, more preferably less than about 100 kΩ/square, and most preferably less than about 1 kΩ/square, measured at 25° C. The electrical resistivity of the mixed ion-electron conductor material is preferably less than about 100 kΩ·cm, more preferably less than about 10 kΩ·cm, and most preferably less than about 0.1 kΩ·cm (100 Ω·cm), measured at 25° C.

The mixed ion-electron conductor material is also preferably characterized by an ionic conductivity of at least about $10^{-12} \Omega^{-1} \cdot cm^{-1}$, more preferably at least about $10^{-9} \Omega^{-1} \cdot cm^{-1}$, and most preferably at least about $10^{-6} \Omega^{-1} \cdot cm^{-1}$, measured at 25° C. (note that the units $\Omega^{-1} \cdot cm^{-1}$ are the same as S/cm). The ionic resistance (inverse of conductance) through the electrode thickness of the mixed ion-electron conductor material is preferably less than about 10 kΩ, more preferably less than about 1 kΩ, and most preferably less than about 0.1 kΩ (100Ω), measured at 25° C.

In some embodiments, the first electrode comprises a region and/or layer with high electrical conductivity to minimize sheet resistance of the first electrode. For example, the first electrode may consist of two layers—a layer that is substantially graphite and a layer that is a porous electrically conductive layer (such as a thin Pt mesh, e.g. with less than 100 nm thickness). This may allow the desirable property that an electrical potential, when applied, does not vary considerably across the electrode surface (e.g., a voltage difference less than 0.1 V) even if the intercalation material has mediocre electrical conductivity or if the intercalation material is very thin. Besides Pt, other exemplary materials for the optional porous, highly electrically conductive layer include, but are not limited to, Ti, Mo, W, and Al. The highly electrically conductive layer may also include more than one layer, such as a Ti adhesion layer and a Pt layer.

The optional porous, highly electrically conductive layer preferably has an electrical resistivity less than $10^{-3}$ Ω·cm, more preferably less than $10^{-4}$ Ω·cm, measured at 25° C. In various embodiments in which a porous, highly electrically conductive layer is present, the electrical resistivity of the highly electrically conductive layer is about, or less than about, $10^{-2}$ Ω·cm, $10^{-3}$ Ω·cm, $10^{-4}$ Ω·cm, $10^{-5}$ Ω·cm, or $10^{-6}$ Ω·cm, measured at 25° C.

The porous, highly electrically conductive layer (when present) preferably does not chemically interact with the ionic species (e.g., the electrically conductive layer does not form an intermetallic phase and does not chemically react with the ionic species). Also, the porous electrically conductive layer preferably does not chemically interact with the ionic conductor (e.g., portions of the electrode cannot form mobile ions within the ionic conductor). The optional porous electrically conductive layer may be in contact with the solid electrolyte, in contact with a vapor chamber volume, in contact with both the solid electrolyte and the vapor chamber volume, or in contact with neither the solid electrolyte nor the vapor chamber volume.

The second (back) electrode must not be in direct electrical contact with the first electrode, i.e., the second electrode is electrically isolated from the first electrode. By "electrically isolated" it is meant that the second electrode is not in direct electrical contact with the first electrode, but electrical communication is possible through an external circuit. Also, the first and second electrodes preferably are not electron-connected nor hole-connected, but are ion-connected, via the ion-conducting layer. Electrons cannot flow directly from the first electrode to the second electrode, but charge can flow, in the form of electrons while in one electrode, then ions while in the ion-conducting layer, and then electrons while in the other electrode.

The second electrode is in direct or indirect contact with the ion-conducting layer. The second electrode is typically not in physical contact with a vapor-cell region. Optionally, the second electrode is in contact with a reservoir region containing alkali or alkaline earth metal atoms, or other metal atoms. Each electrode is typically connected to an electrical lead.

The second electrode may be fabricated from common electrode materials including, but not limited to, Pt, Mo, W, Ni, Cu, Fe, and Al. The second electrode may be solid or porous.

In some embodiments, the second electrode is a mixed ion-electron conductor. The second electrode may include various mixed ion-electron conductor materials. For example, the mixed ion-electron conductor material may be selected from the group consisting of alkali monoferrites (e.g. $RbFeO_2$, $CsFeO_2$, etc.), alkali monoaluminates (e.g. $RbAlO_2$, $CsAlO_2$, etc.), alkali monogallates (e.g. $RbGaO_2$, $CsGaO_2$, etc.), and combinations thereof. Any of these alkali monoferrites, alkali monoalluminates, or alkali monogallates are optionally doped with one or more atoms selected from Pb, Cd, Ca, P, V, Nb, Ta, Si, Ti, and/or Ge, for example. Exemplary compounds for the ion-electron conductor of the second electrode include, but are not limited to, $Rb_{1-2x}M_xAlO_2$ (x is from 0 to less than 0.5) wherein M=Pb, Cd, and/or Ca; $Rb_{2-2x}Fe_{2-x}M_xO_4$ (x is from 0 to 1) wherein M=P, V, Nb and/or Ta; $Rb_{2-2x}Ga_{2-x}M_xO_4$ (x is from 0 to 1) wherein M=P, V, Nb and/or Ta; $Rb_{2-2x}Al_{2-x}M_xO_4$ wherein M=P, V, Nb and/or Ta; and $Rb_{1-x}Al_{1-x}M_xO_2$ (x is from 0 to less than 1) wherein M=Si, Ti, and/or Ge.

In some embodiments, the mixed ion-electron conductor material of the second electrode may be selected from alkali pyrophosphates, such as $Rb_4P_2O_7$. The alkali pyrophosphate is optionally doped with one or more atoms selected from Ca, Sr, Ba, Pb, Y, La, and/or Nd, for example. Exemplary compounds for the ion-electron conductor include, but are not limited to, $Rb_{4-2x}M_xP_2O_7$ (x is from 0 to less than 2) wherein M=Ca, Sr, Ba, and/or Pb; and $Rb_{3-3x}M_xPO_4$ (x is from 0 to less than 1) wherein M=Y, La, and/or Nd.

In some embodiments, the second electrode contains an intercalable compound that is capable of being intercalated by at least one element (in ionic and/or neutral form) selected from the group consisting of Rb, Cs, Na, Ca, K, and Sr, for example.

In some embodiments, the second electrode includes more than one layer, such as a Ti adhesion layer and a Pt layer, or a Cu layer and a graphite layer, for example.

It is desirable that an electrical potential, when applied, does not vary considerably (e.g. <0.1 V) across the second electrode surface. Thus, the second electrode thickness is preferably selected based on the second-electrode material resistivity and the expected ionic current through the ion-conducting layer.

The second electrode may be a uniform layer or a non-uniform layer. The thickness of the second electrode may be less than 500 m or less than 100 μm. In various embodiments, the thickness of the second electrode is about 1, 5, 10, 20, 30, 40, 50, 75, 100, 200, or 500 μm.

Each electrode is typically connected to an electrical lead fabricated from an electrically conductive material. A lead is an electrical connection consisting of a length of wire, metal pad, metal trace, or other electrically conductive structure. Leads are used to transfer power and may also provide physical support and potentially provide a heat sink. In some embodiments, a device is provided without such leads, which may be added at a later time, before use.

Dielectric materials may be employed to isolate and electrically insulate the electrodes from other parts of the system.

Based on selection of materials for first electrode, second electrode, and ionic conductor, fast system response times may be achieved. The response time (for sourcing and/or sinking metal atoms) of the system is preferably less than about 10 seconds, more preferably less than about 1 second, and most preferably less than about 0.1 second. In various embodiments, the system response time is about 1, 0.5, 0.2, 0.1, 0.05, 0.04, 0.03, 0.02, or 0.01 seconds.

At least one atom reservoir is typically present within the system. The atomic species contained within the reservoir is preferably the reduced form of the same ionic species as in the ionic conductor, e.g., Rb, Cs, Na, Ca, K, Sr, Yb, and/or Hg, for example. Alternatively, a different atomic species (compared to the atoms in the ionic conductor) may be contained within the reservoir. For example, when the device is sourcing atoms, Na may be contained within the reservoir and be oxidized at the second electrode, while Rb may be reduced at the first electrode.

The atom reservoir has walls that are preferably impermeable to the atomic species contained inside the reservoir, to avoid unintentional loss of atoms out of the reservoir. The side of a reservoir wall that faces the interior of the reservoir preferably does not chemically interact with the ionic species, e.g., does not form an intermetallic phase and does not chemically react with the ionic species. The side of a reservoir wall that touches the ionic conductor, if any, preferably does not chemically interact with the ionic conductor, other than possible chemical bonding to adhere to the ionic conductor. Preferably, the wall does not form mobile ions that are transported within the ionic conductor. Exemplary materials for the atom reservoir walls include Pt, Mo, W, or a combination thereof.

The atom reservoir is in ionic communication with the ion-conducting layer, which means that ions, or their neutral forms, are capable of being transported between the atom reservoir and the ion-conducting layer.

In preferred embodiments, the atom reservoir is in contact with the second electrode and/or with an additional electrode. The atom reservoir may be integrated with the second electrode and/or with an additional electrode. For example, the atom reservoir may include, in part or in whole, graphite or graphitic carbon. The graphite or graphitic carbon (e.g., a graphite intercalable compound) provides electrical conductivity and also a means of storing atoms.

The atom reservoir volume preferably contains metal atoms (e.g., alkali metal or alkaline earth metal) in the vapor phase and possibly in the solid and/or liquid phases as well. Optionally, the temperature and concentration are selected to ensure metal atoms are essentially in the vapor phase.

The atom reservoir is preferably designed to accommodate mechanical strain from a changing reservoir volume due to the loss or introduction of atoms. For instance, a gap may be situated between an intercalable compound and the reservoir walls to permit expansion of the intercalable compound without straining the walls. The walls may be designed to elastically and/or plastically deform, via material selection (e.g. using metals, polymers, or a combination thereof) and/or via reservoir design (e.g., using a bellows).

At least one heater is integrated within the system. The heater is preferably a resistive heater, such as a patterned thin metal trace (e.g., platinum or nickel-chromium alloy). The heater may alternatively be a radiative heater, a thermoelectric heater, an inductive heater, or another type of heater, or a combination of heaters. The heater is preferably in good thermal communication with the ionic conductor-specifically, the region of the ionic conductor near the first electrode. In some embodiments, the heater is configured to heat the first electrode and the region of the ionic conductor near the first electrode and adjacent to the atom vapor. In certain embodiments, the entire ionic conductor is heated. In these or other embodiments, the atom reservoir is also heated, either with the same heater or with an additional, reservoir heater.

At least one temperature sensor is preferably included in the system, for monitoring and controlling the temperature of the heated region. The temperature sensor may be a thermocouple, a resistance temperature detector (RTD), a semiconductor-based sensor, a thermistor, or another type of temperature sensor. In some embodiments, a Pt-based RTD is employed as the temperature sensor.

At least one thermal isolation structure is incorporated within the system. A thermal isolation structure minimizes heat transfer from the heated region of the device to the colder, ambient environment. A thermal isolation structure is configured to minimize heat loss out of the heated region into a cold region, by functioning as insulation to retain heat within the heated region. The thermal isolation structure preferably has a high value of thermal resistance, as further explained below.

A thermal isolation structure may be made of the same material and layer as the atom reservoir walls, in some embodiments. In these or other embodiments, a thermal isolation structure may be made of the same material and layer as the ionic conductor. The thermal isolation structure is preferably polymer, ceramic, or glass, although metal may be utilized as well, or a combination of the foregoing.

In some embodiments, the thermal isolation structure is fabricated from a material selected from the group consisting of β-alumina (e.g., Rb-β-alumina, Na-β-alumina, or Sr-β-alumina), β"-alumina (e.g., Rb-β"-alumina, Na-β"-alumina, or Sr-β"-alumina), α-alumina, silica, fused silica, quartz, borosilicate glass, silicon, silicon nitride, silicon carbide, and combinations thereof.

The thermal isolation structure may be designed to accommodate materials with any thermal conductivity. High-thermal-conductivity materials will benefit from long, high-aspect ratio connections, while lower-thermal-conductivity materials may utilize shorter, stubbier connections.

An important design parameter for the thermal isolation structure is the thermal resistance. The thermal resistance is the temperature difference across the thermal isolation structure when a unit of heat energy flows through it in unit time; or equivalently, the temperature difference, at steady state, between two defined surfaces of the thermal isolation structure that induces a unit heat flow rate. Because the desire is for a low heat flow rate, a high temperature difference is desired, i.e., a high value of thermal resistance. The thermal resistance of a thermal isolation structure is preferably at least 100 K/W, more preferably at least 1,000 K/W, and most preferably at least 10,000 K/W. In various embodiments, at least one thermal isolation structure is provided with a thermal resistance of about, or at least about, 100, 200, 500, 1,000, 2,000, 3,000, 4,000, 5,000, 6,000, 7,000, 8,000, 9,000, or 10,000 K/W. When more than one thermal isolation structure is present in the system, the individual thermal resistances may vary, preferably within these ranges.

A thermal isolation structure may also be configured to impart mechanical strain relief, thereby preventing mechanical damage due to thermal strains that build up when the ionic conductor is heated to a higher temperature than the base substrate. In some embodiments, a thermal isolation structure is mechanically connected to a base substrate, for example through a frame. Preferably, the thermal isolation structure is designed to reduce thermal stress or residual stress by at least 2×, preferably at least 10×, and more preferably at least 100× from one side of the thermal isolation structure to the other side. The thermal or residual stress reduction is not an inherent material property, but is a function of the geometric design of the thermal isolation structure and its material properties.

In some embodiments, a thermal isolation structure is a suspension beam. Typically, a plurality of suspension beams will be present to connect the heated region to the cold region. The heated region only contacts the cold region through the suspension beams. The suspension beams may be straight beams, folded beams, tortuous beams, circular beams, and so on. The suspension beams may be made in any one (or more) layers in a planar process, such as surface or bulk micromachining. The rest of the heated region may be surrounded by vacuum or a vapor phase (e.g., containing an inert gas), either of which has a high thermal resistance to the cold region. As an alternative, the vapor/vacuum region may include a thermal insulator material, such as an aerogel.

In some embodiments, a thermal isolation structure has a thin metal film patterned on it for electrical interconnections. In some preferred embodiments, a resistive heater and a temperature sensor are patterned on (in contact with) the same layer as at least one thermal isolation structure. Preferably, electrical connections to the heater and the temperature sensor are also patterned on one or more thermal isolation structures. Optionally, part or all of the heater may be patterned on a thermal isolation structure or on multiple thermal isolation structures. In some embodiments, a thin film resistive heater is patterned on one or more sides of the same layer as a thermal isolation structure. In cases where the ionic conductor is separate from the thermal isolation structure, the heater may be patterned on the same side or the opposite side of the thermal isolation structure compared to the position of the ionic conductor. In cases where the ionic conductor is the same as a thermal isolation structure, or a layer thereof, the heater may be patterned on either side of the ionic conductor (i.e. on the first-electrode side and/or on the second-electrode side).

The integration of the heater and thermal isolation structures within the system enables low system power input. The system power input for sourcing and/or sinking metal atoms is preferably less than about 500 mW, more preferably less than about 200 mW, and most preferably less than about 100 mW. In various embodiments, the system power input for sourcing and/or sinking metal atoms is about 1000, 500, 400, 300, 200, 100, 50, 25, or 10 mW.

Reference is now made to the accompanying drawings, which should not be construed as limiting the invention in any way, but will serve to illustrate various embodiments.

FIG. 1 is a plan-view schematic of an atom vapor-density control system with separate ionic conductor, reservoir wall, and thermal isolation structures. System 100 includes heater bond pad 101, heater trace 102, thermal isolation structures 103, first electrode 104, first electrode electrical connection 105, first electrode bond pad 106, ionic conductor 107, substrate 108, second electrode 109 (not shown because it is on the opposite side of ionic conductor 107), second electrode bond pad 110, second electrode electrical connection 111, frame 112, heater bond pad 113, heater trace 114, RTD bond pads 115, and RTD traces 116 (RTD=resistance temperature detector).

Figure 2:
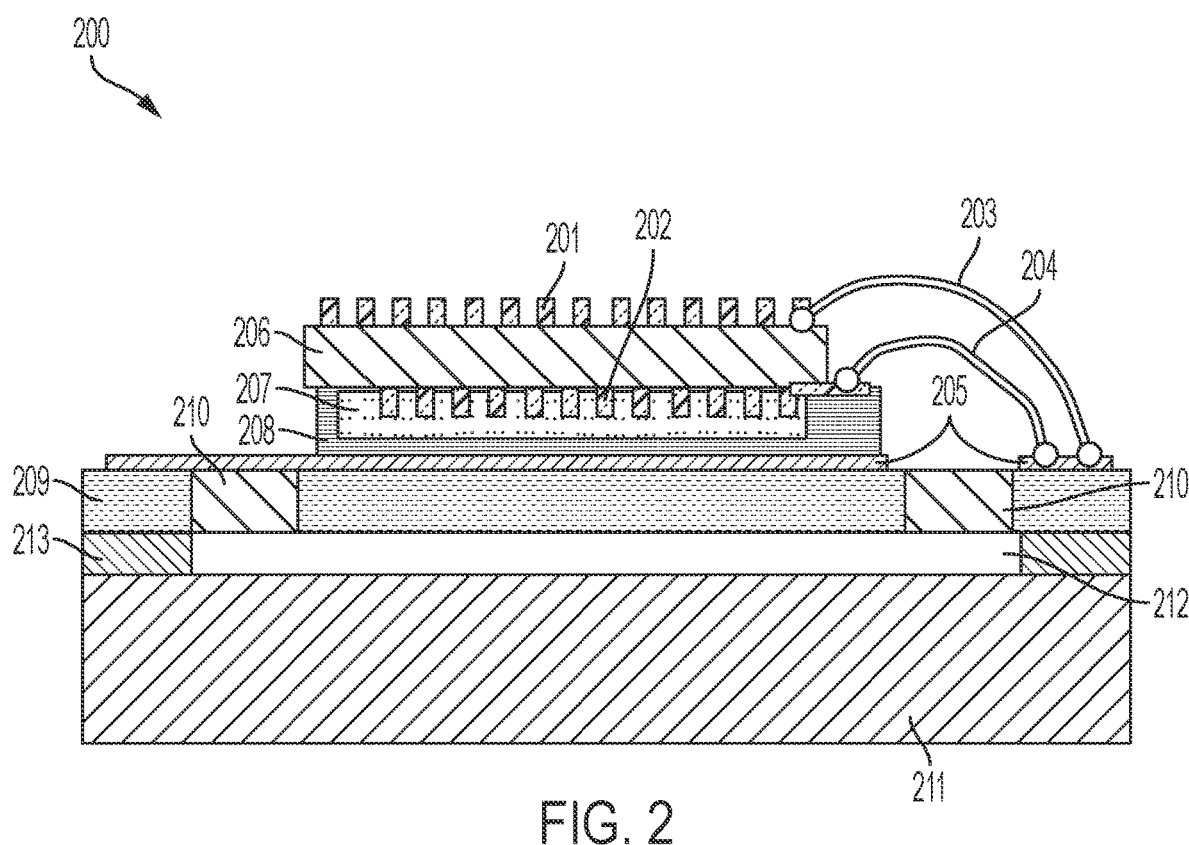
FIG. 2 is a side-view schematic of an atom vapor-density control system with separate ionic conductor, reservoir wall, and thermal isolation structures, in some embodiments.

FIG. 2 is a side-view schematic of an atom vapor-density control system with separate ionic conductor, reservoir wall, and thermal isolation structures. System 200 includes first electrode 201, second electrode 202, first electrode electrical connection 203, second electrode electrical connection 204, metal traces 205 (for a heater, RTD, and electrical interconnects to electrodes), ionic conductor 206, reservoir 207, reservoir wall 208, frame 209, thermal isolation structures 210, substrate 211, vacuum or vapor space 212, and substrate-frame connectors 213 (which are optionally the same material as the substrate 211 or the frame 209).

Figure 3:
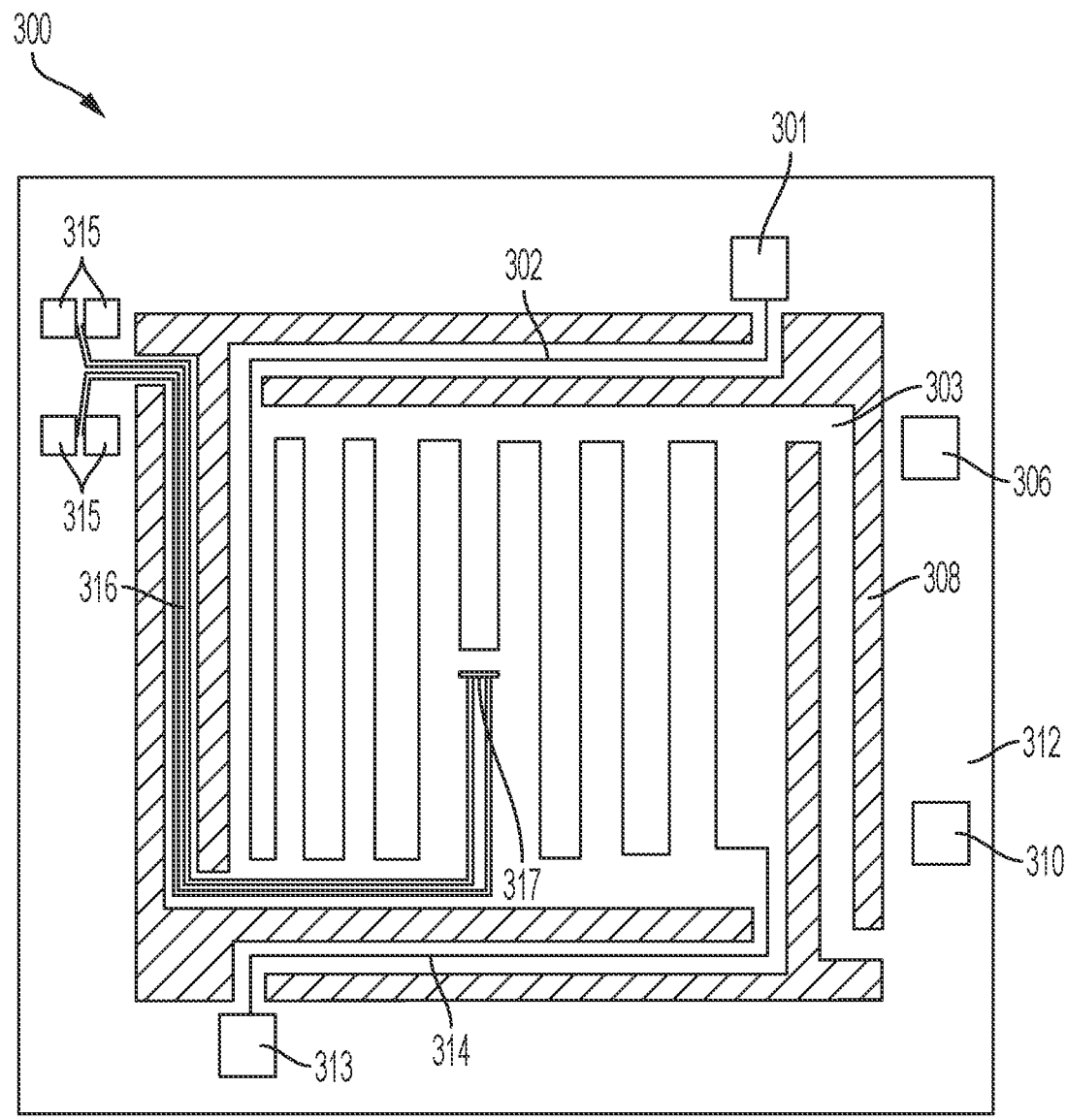
FIG. 3 is a plan-view, section-view schematic of an atom vapor-density control system (the section view is between the metal trace layer and the reservoir wall) corresponding to the schematic in FIG. 1.

FIG. 3 is a plan-view, section-view schematic of an atom vapor-density control system (the section view is between the metal trace layer and the reservoir wall) corresponding to the schematic in FIG. 1. System section view 300 shows heater bond pad 301, heater trace 302, thermal isolation structures 303, first electrode bond pad 306, substrate 308, second electrode bond pad 310, frame 312, heater bond pad 313, heater trace 314, RTD bond pads 315, RTD traces 316, and RTD 317.

Figure 4:
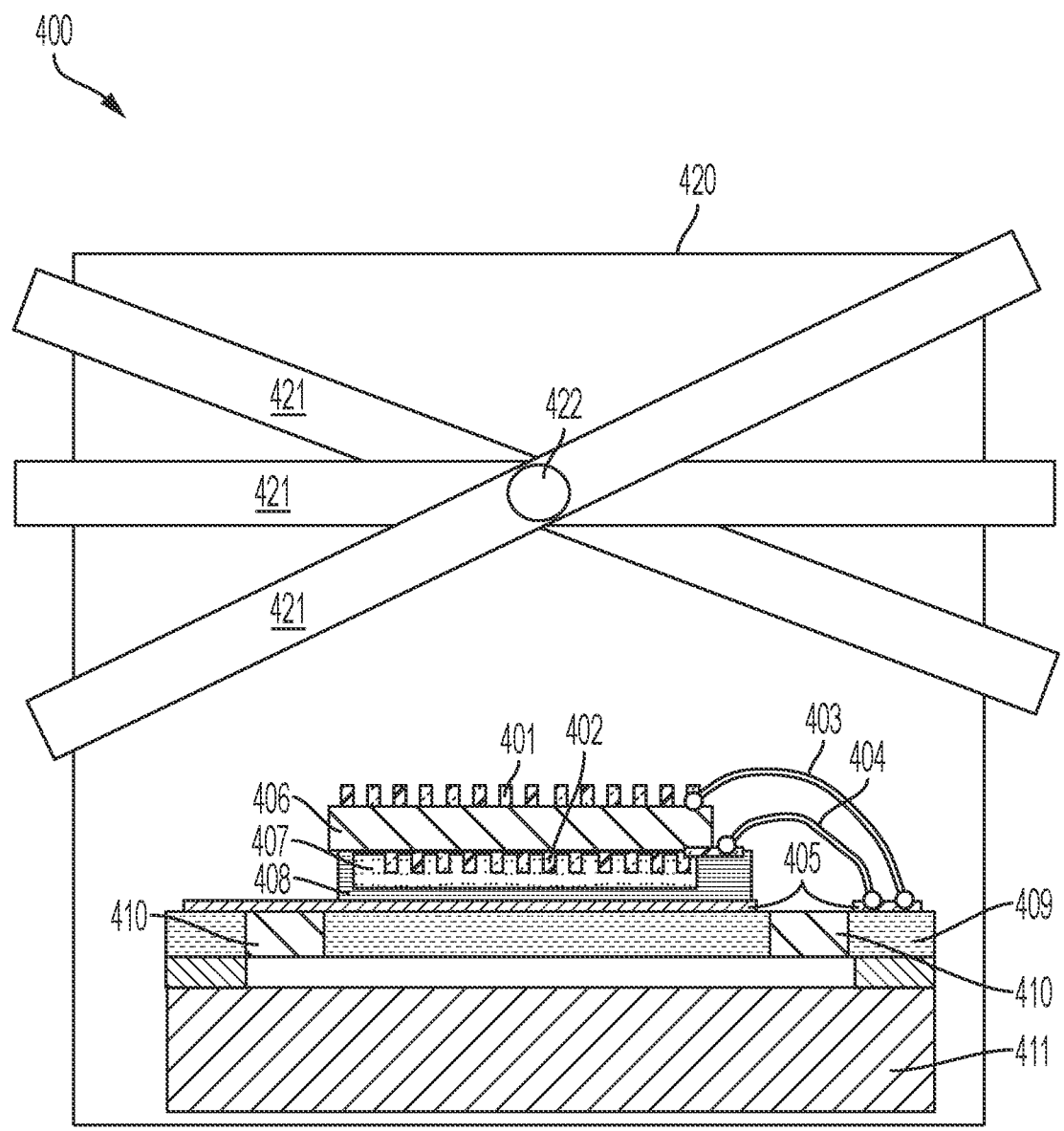
FIG. 4 is a side-view schematic of an atom vapor-density control system where an atom source and integrated heater are situated inside an atom vapor cell, in some embodiments.

FIG. 4 is a side-view schematic of an atom vapor-density control system where an atom source and integrated heater are situated inside an atom vapor cell 420. System 400 includes first electrode 401, second electrode 402, first electrode electrical connection 403, second electrode electrical connection 404, metal traces 405 (for a heater, RTD, and electrical interconnects to electrodes), ionic conductor 406, reservoir 407, reservoir wall 408, frame 409, thermal isolation structures 410, substrate 411, vapor cell 420, laser beams 421, and population of cold atoms 422. The laser beams 421 and population of cold atoms 422 will not be present when the system 400 is not in operation.

FIG. 4 shows laser beams 421 traversing three optical paths in the vapor cell 420 and trapping a population of cold atoms 422. In some embodiments, the three optical paths are orthogonal to each other. FIG. 4 is a two-dimensional flattened projection of three orthogonal laser paths 421 in three dimensions. An optional magnetic field source and resulting magnetic field lines, which also play a role in the trapping of atoms, are not depicted in this sketch.

It shall be understood that laser beams may or may not be present in any vapor cell described in this specification. That is, a source of laser beams may be present but not operating, in which case no laser beams will enter or be present within the vapor-cell region. Or a vapor cell may be provided without a source of laser beams, which source may be added at a later time, prior to operation of the vapor-cell system. In any event, the laser beams can be omitted from the drawings for clarity, it being understood that laser beams may be present. Drawings other than FIG. 4 herein do not explicitly depict laser beams or optical paths, it being again understood that that laser beams may or may not be actually present. Likewise, magnetic field sources (external to the device) and magnetic field lines (within the device) are not depicted in the drawings, to aid in the depiction of device features and because the magnetic field sources and lines may or may not be actually present.

Figure 5:
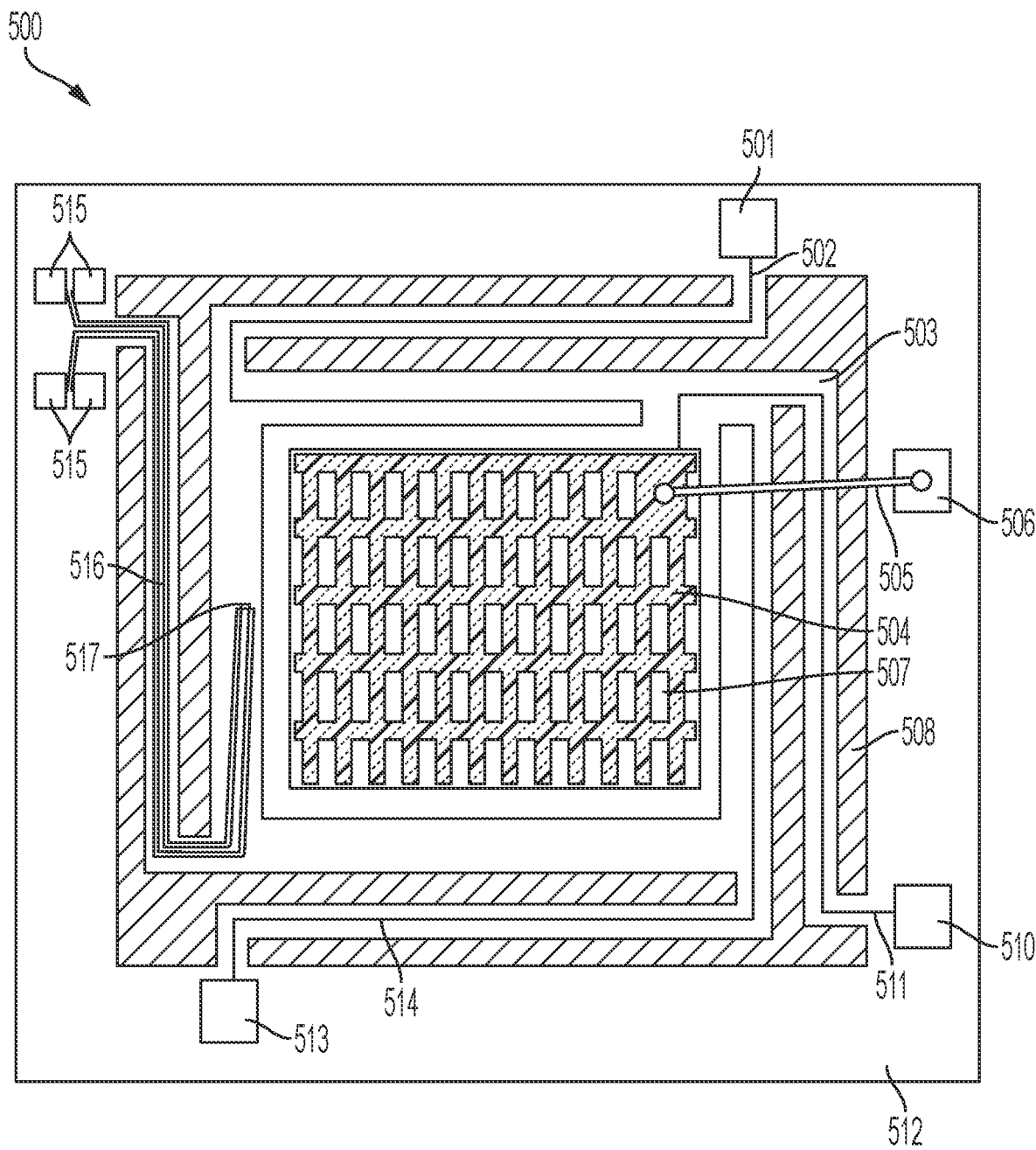
FIG. 5 is a plan-view schematic of an atom vapor-density control system with a separate ionic conductor, where the reservoir wall is formed in the thermal isolation structure, in some embodiments.

FIG. 5 is a plan-view schematic of an atom vapor-density control system with a separate ionic conductor, where the reservoir wall is formed in the thermal isolation structure. System 500 includes heater bond pad 501, heater trace 502, thermal isolation structures 503, first electrode 504, first electrode electrical connection 505, first electrode bond pad 506, ionic conductor 507, substrate 508, second electrode 509 (not shown because it is on the opposite side of ionic conductor 507), second electrode bond pad 510, second electrode electrical connection 511, frame 512, heater bond pad 513, heater trace 514, RTD bond pads 515, and RTD traces 516, and RTD 517.

Figure 6:
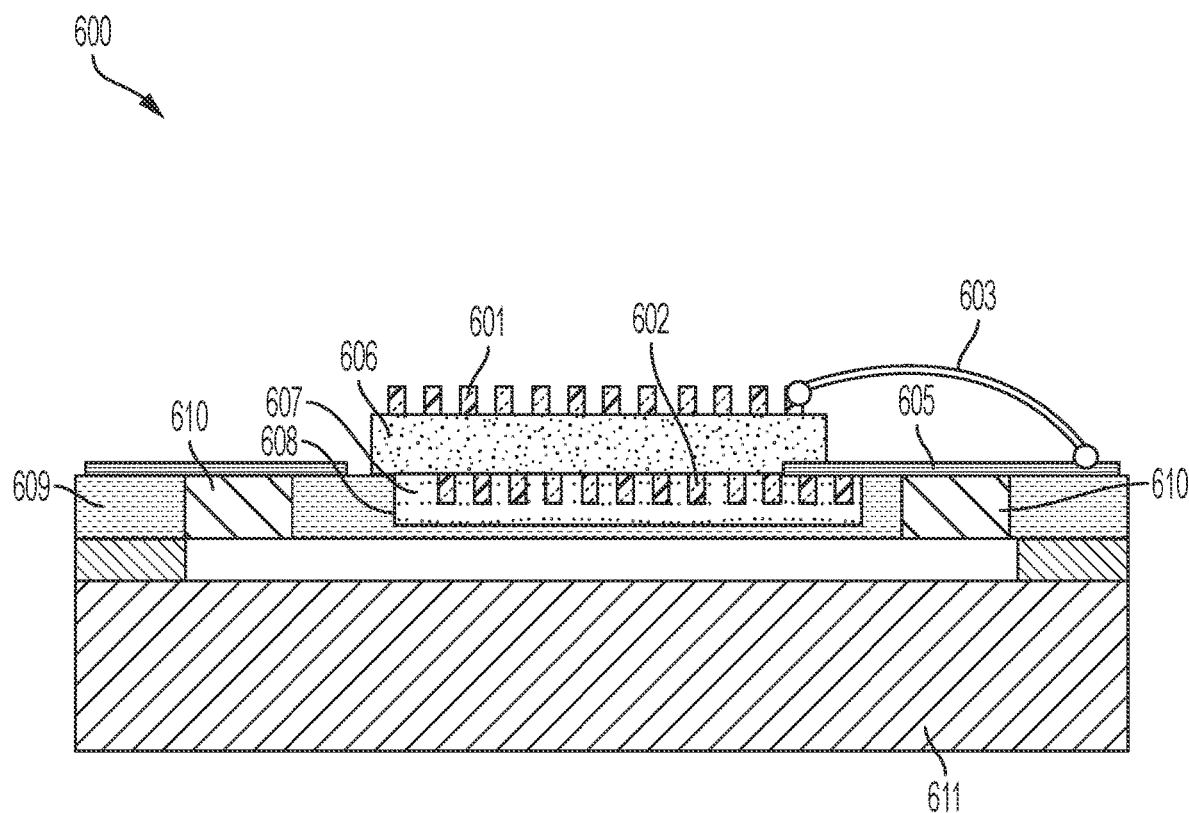
FIG. 6 is a side-view schematic of an atom vapor-density control system with a separate ionic conductor, where the reservoir wall is formed in the thermal isolation structure, in some embodiments.

FIG. 6 is a side-view schematic of an atom vapor-density control system with a separate ionic conductor, where the reservoir wall is formed in the thermal isolation structure. System 600 includes first electrode 601, second electrode 602, first electrode electrical connection 603, metal traces 605 (for a heater, RTD, and electrical interconnects to electrodes), ionic conductor 606, reservoir 607, reservoir wall 608, frame 609, thermal isolation structures 610, and substrate 611.

Figure 7:
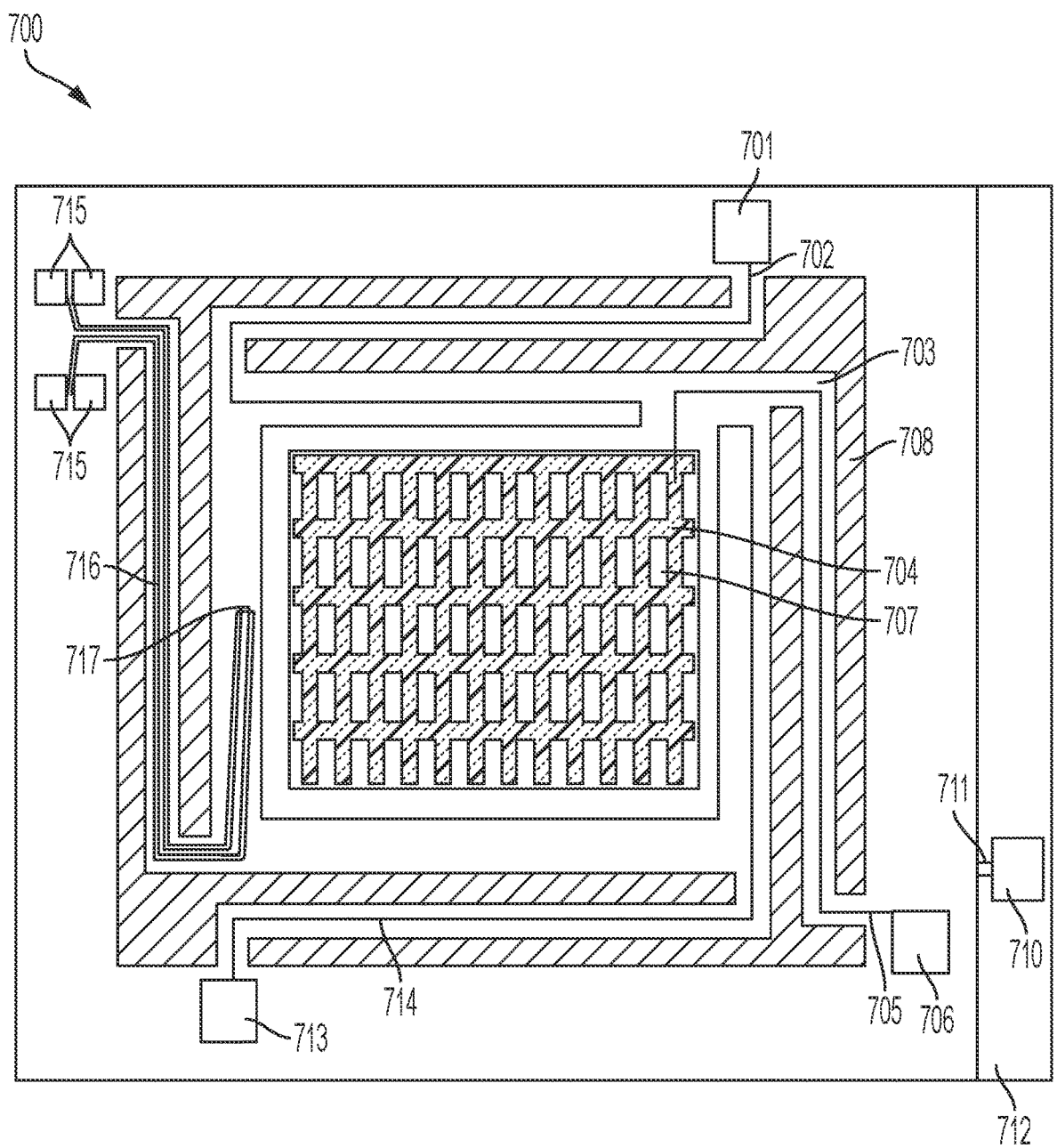
FIG. 7 is a plan-view schematic of an atom vapor-density control system where the ionic-conducting layer includes the thermal isolation structures, in some embodiments.

FIG. 7 is a plan-view schematic of an atom vapor-density control system where the ionic-conducting layer includes the thermal isolation structures. System 700 includes heater bond pad 701, heater trace 702, thermal isolation structures 703, first electrode 704, first electrode electrical connection 705, first electrode bond pad 706, ionic conductor 707, substrate 708, second electrode 709 (not shown because it is on the opposite side of ionic conductor 707), second electrode bond pad 710, second electrode electrical connection 711 (which runs on the other side of the thermal isolation structures 703 relative to the first electrode electrical connection 705, as shown in FIG. 8), frame 712, heater bond pad 713, heater trace 714, RTD bond pads 715, and RTD traces 716, and RTD 717.

Figure 8:
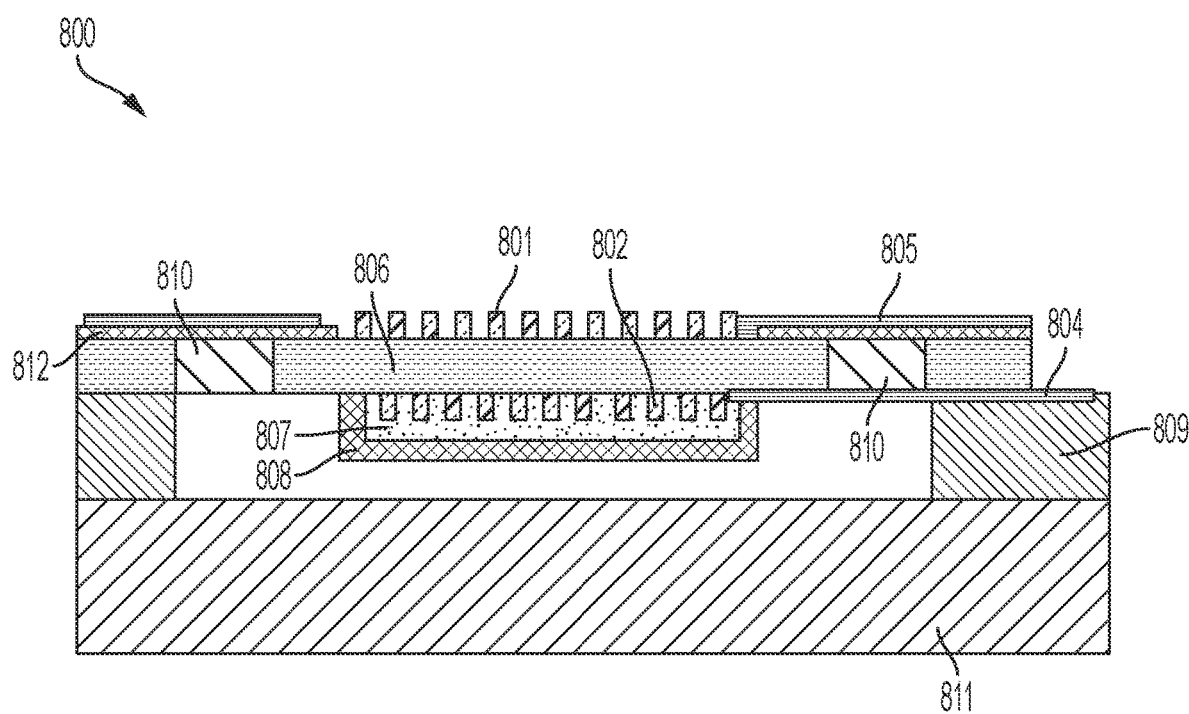
FIG. 8 is a side-view schematic of an atom vapor-density control system where the ionic-conducting layer includes the thermal isolation structures, in some embodiments.

FIG. 8 is a side-view schematic of an atom vapor-density control system where the ionic-conducting layer includes the thermal isolation structures. System 800 includes first electrode 801, second electrode 802, second electrode electrical connection trace 804, metal traces 805 (for a heater, RTD, and electrical interconnects to electrodes), ionic conductor 806, reservoir 807, reservoir wall 808, frame 809, thermal isolation structures 810, and substrate 811. Note that in some embodiments, thermal isolation structures 810 include the entire ionic conductor 806.

Figure 9:
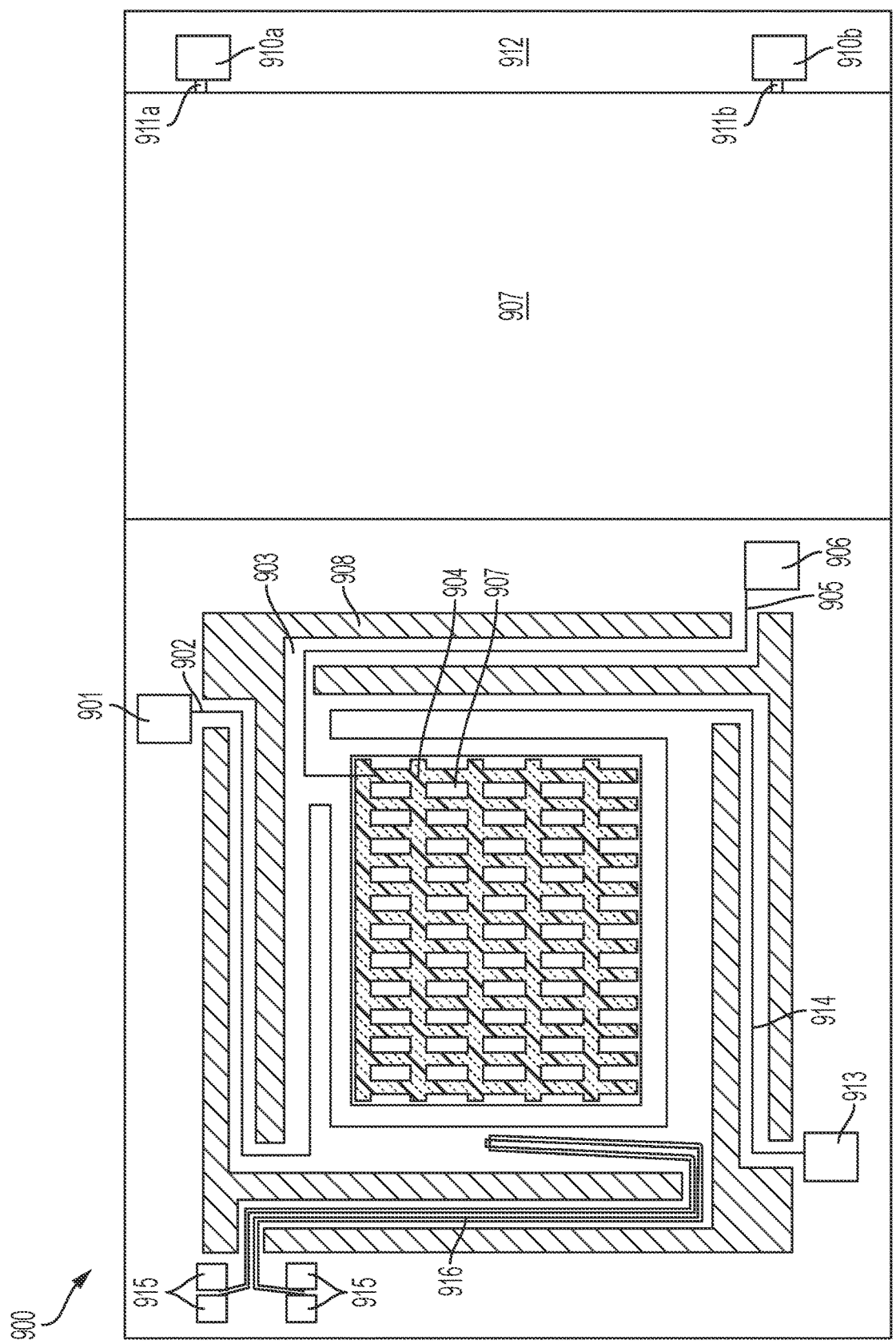
FIG. 9 is a plan-view schematic of an atom vapor-density control system with an additional, remote reservoir, in some embodiments.

FIG. 9 is a plan-view schematic of an atom vapor-density control system with an additional, remote reservoir. System 900 includes heater bond pad 901, heater trace 902, thermal isolation structures 903, first electrode 904, first electrode electrical connection 905, first electrode bond pad 906, ionic conductor 907, substrate 908, second electrode 909a (not shown because it is on the opposite side of ionic conductor 907), additional second electrode 909b (not shown because it is also on the opposite side of ionic conductor 907), second electrode bond pad 910a, additional second electrode bond pad 910b, second electrode electrical connection 911a (which runs on the other side of the ionic conductor 907), additional second electrode electrical connection 911b (which also runs on the other side of the ionic conductor 907), frame 912, heater bond pad 913, heater trace 914, RTD bond pads 915, RTD traces 916, and RTD 917.

Figure 10:
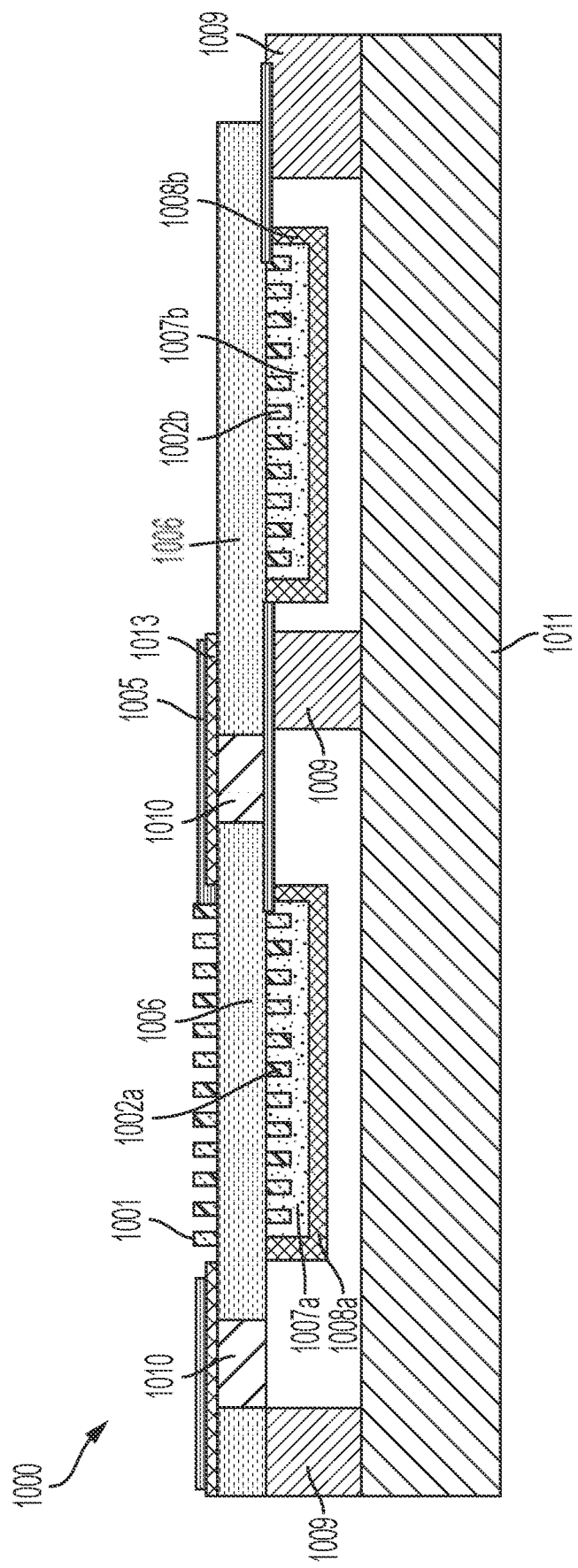
FIG. 10 is a side-view schematic of an atom vapor-density control system with an additional, remote reservoir, in some embodiments.

FIG. 10 is a side-view schematic of an atom vapor-density control system with an additional, remote reservoir. System 1000 includes first electrode 1001, second electrode 1002a, additional second electrode 1002b, metal traces 1005 (for a heater, RTD, and electrical interconnects to electrodes), ionic conductor 1006, reservoir 1007a, second (remote) reservoir 1007b, reservoir wall 1008a, second (remote) reservoir wall 1008b, frame 1009, thermal isolation structures 1010, substrate 1011, and electrically insulating layer 1013.

A number of variations of the device are possible.

The device may include a vapor chamber with a vapor chamber volume. The vapor chamber is in contact with the first electrode, and preferably with the ionic conductor. The vapor chamber contains an atomic vapor, preferably that of an alkali metal or an alkaline earth metal. The atomic vapor may include metals such as Hg, rare earth metals (e.g., Yb, Ce, Nd, Sc, or Y), or any other atomic metal.

The atomic vapor may be isotopically enriched or purified. For example, when an alkali or alkaline earth metal is isotopically enriched, the relative abundance of the isotopes of a given element are altered, thus producing a form of the element that has been enriched in one particular isotope and depleted in its other isotopic forms. The metal atoms may be isotopically pure, which means the atoms include one isotope of the selected metal.

In some embodiments, the vapor chamber is under partial vacuum, containing only the atomic vapor as a rarefied gas. In other embodiments, the vapor chamber contains, in addition to the atomic vapor, additional gases such as (but not limited to) $N_2$, $CH_4$, He, Ar, Ne, Xe, $NH_3$, or a combination thereof. Non-metal atoms (e.g., elemental H, N, or O) may also be used as additional gases. The additional gas or gases may be used as buffer gas or as spin exchange gas, for example. The additional gas or gases may be isotopically enriched or purified. Any additional gas is preferably not reactive with the atomic vapor (e.g., the alkali or alkaline earth metal atoms).

The vapor chamber may be hermetically sealed. The vapor chamber may also be configured in fluid communication with a larger system, which may or may not be collectively (with the vapor chamber) hermetically sealed. The larger system, for example, could be part of a high-vacuum system containing pumps, pressure/vacuum gauges, atom dispensers, getters, getter pumps, getter sources, pill sources, etc.

One or more walls of the vapor chamber volume are at least partially transparent, and preferably substantially transparent (e.g., at least 80%, 90%, 95%, or 99% transparent), at relevant wavelengths such that there is at least one optical path through the vapor cell volume. It is preferred that the optical path(s) go through the vapor cell, that is, from one wall to another wall. In some embodiments, a laser beam may enter the vapor cell, reflect off a mirrored surface inside the cell, and leave the cell through the same side that it entered.

An "optical path" is the path of a spectroscopic probing beam of light (or other type of laser beam) into the alkali or alkaline earth vapor-cell region, or in some cases, into a reservoir region. The optical path is optional in the sense that the device itself does not inherently include the beam of light, while operation of the device will at least periodically mean that an optical path is traversing into or through the alkali or alkaline earth vapor-cell region. Also note that an optical path is not necessarily a straight line. Internal reflectors may be included in the system, so that optical reflection occurs. In that case, the optical beam could enter and exit along the same wall (detection probe on the same side as the laser source), for example.

One or more walls of the vapor chamber volume are substantially transparent at relevant wavelengths such that there is an optical path through the vapor cell volume. It is preferable that there are three orthogonal optical paths to facilitate the formation of a magneto-optical trap (MOT) and for atomic cloud imaging. Vapor-cell optical paths do not need to be orthogonal when entering the vapor cell. For example, there could be mirrors inside the vapor cell that make them orthogonal only inside the vapor cell. There could be one optical path entering the cell, which optical path is split within the vapor cell. In some embodiments, within the vapor cell, along three different orthogonal axes based on the location of trapped atoms, two optical paths (one in each direction) are located on each of the three axes.

Walls enclose the vapor-cell region, sealing it from the ambient environment. The walls may be fabricated from silicon, $SiO_2$, fused silica, quartz, pyrex, metals, dielectrics, or a combination thereof, for example. At least one of the walls includes a substantially transparent portion such that there is an optical path through the vapor-cell region. A wall can be made transparent either by fabricating from an optically transparent material, or by including an optical window in a part of the wall.

The vapor cell may be situated inside a magnetic field. Coils of wire driven in an anti-Helmholtz configuration surrounding the vapor cell can be used to generate the magnetic fields required for the trap. Other magnetic-field sources (such as magnets or materials capable of generating magnetic flux) may be utilized to generate magnetic fields within the vapor-cell region. The magnetic-field source may be provided separately from the vapor cell, and these components may be assembled and disassembled from each other for various reasons.

The vapor cell may be contained within an oven. The purpose of the oven may be to control the temperature of the vapor cell at a temperature above the ambient temperature, for example.

The device may be implemented at a wide variety of length scales. The length scale may be characterized by the cube root of the vapor chamber volume. This length scale may vary widely. A length scale from about 30 mm to about 10 microns is typical for chip-scale atomic timing and navigation systems, with 0.5-10 mm being preferable.

Chip-scale devices are preferably constructed using microfabrication techniques, including some or all of lithography, evaporation, shadow-masking, evaporation, sputtering, wafer bonding, die bonding, anodic bonding, glass frit bonding, metal-metal bonding, and etching.

Multiple ionic conductors, each with their own electrodes, may be present in a single device. Multiple first electrodes may or may not be electrically connected through electrical leads or electrical traces. Likewise, multiple second electrodes may or may not be electrically connected through electrical leads or electrical traces.

Multiple sets of first (front) electrodes, ion-conducting layers, and second (back) electrodes may generally be present. In some embodiments, two or more front electrodes are employed. In these or other embodiments, two or more back electrodes are employed. In any of these embodiments, or other embodiments, two or more ionic conductors are employed.

One or more of the second electrodes may contain an alternate source of replacement ions for the ion-conducting layer. The alternate source of replacement ions may be a metal (e.g. silver), an ion-containing species (e.g. a salt), an intercalated compound (e.g. Rb intercalated into graphite), an intermetallic (e.g. gold and rubidium), or a solid or liquid elemental form of an alkali metal or an alkaline earth metal.

In some embodiments, an intercalation compound (e.g. Rb intercalated into graphite) is a substantial portion of the second electrode. In the case of a solid or liquid alkali metal second electrode, the alkali metal may be capped with a non-reacting layer such as Pt to seal in the alkali metal and prevent corrosion and/or oxidation.

When a potential is applied across a first electrode and a paired second electrode which contains an alternate source of replacement ions such that the first electrode is at a lower electrical potential than the second electrode, metal ions in the ion-conducting layer between the electrodes will migrate (i.e. conduct) towards the first electrode. They will be replaced by the replacement ions at the second electrode and/or by ionized atoms from the atom reservoir. This prevents the depletion of ions in the ion-conducting layer near the second electrode, thus preventing the charging of a pseudocapacitor which would otherwise require increasing electrical potential to transport more ions. However, this does contaminate the ion-conducting layer with the make-up replacement ions.

The device may also include electrical connections to the first and second electrodes. The electrical connections are preferably connected to metal-containing bond pads for connection to an external circuit. The electrical connections may include one or more connections selected from the group consisting of through-wafer vias, patterned electrically conductive thin films, doped regions of semiconductors, and wire bonds. Patterned thin films may be parallel with the first electrode, in cases where the first electrode is substantially flat. Parts of patterned thin films may be at an angle with the first electrode, in cases where the first electrode is substantially flat. Typically, a portion of the electrical connection to one or more of the electrodes will be out of the plane of the electrode it is connected, in cases where the first electrode is substantially flat.

The device may also contain an atom chip for intra-system generation of magnetic fields for microtraps. An atom chip generally is an arrangement of microfabricated current-carrying wires patterned on a substrate which is used to trap and control atoms via the strong magnetic field gradients generated inside the vapor. Atoms chips enable highly sophisticated experiments to be condensed into areas on the order of a few square centimeters and readily lend themselves to the miniaturization and integration of cold atom systems for practical applications. Atom chips may utilize use metal traces patterned via lithographic techniques to create magnetic fields involved in trapping populations of atoms. See U.S. Pat. No. 7,126,112 for "Cold atom system with atom chip wall"; Fortagh et al., *Rev. Mod. Phys.* 79, 235 (2007) Reichel et al., *Atom Chips*, Wiley, 2011; and Treutlein, *Coherent manipulation of ultracold atoms on atom chips*, Dissertation, Ludwig-Maximilians-University Munich, 2008, each of which is hereby incorporated by reference. Atom chips may be implemented as one wall of a vapor cell.

The atom chip and the ionic conductor need not be the same size. An atom chip may be disposed on a different vapor cell face from the ionic conductor. An atom chip may be fabricated on a base chip that is heterogeneously integrated with the ionic conductor on the same vapor cell face. The atom chip may be closer to the vapor cell volume than the ionic conductor, in which case the vapor atoms may pass around the edges of the atom chip or through one of more holes in the atom chip, for example. The ionic conductor may be closer to the vapor cell than the atom chip, in which case the trapped population of cold atoms may be situated above the ionic conductor.

An atom chip may be fabricated directly on the ionic conductor or on the first electrode. The atom chip traces that generate the magnetic fields for microtraps may be adjacent to the top electrode traces in this case. The atom chip traces that generate the magnetic fields for microtraps may be separated from the ionic conductor by a material which is both an electronic insulator and an ionic insulator (e.g., glass materials).

As stated above, an intercalable compound may be utilized for the first electrode, the second electrode, and/or the atom reservoir. An "intercalable compound" (or "intercalatable compound") is a host material that is capable of forming an intercalation compound with guest atoms which comprise the atomic vapor in the vapor cell. Stated another way, the intercalable compound is intercalative for (capable of intercalating) at least some of the atoms in the atomic vapor. The guest atoms that are intercalated may be neutral atoms, ionic species, or a combination thereof. Typically, the guest atoms are intercalated as neutral atoms.

In some embodiments, the host material actually contains the guest species, resulting in a material which may be referred to as an "intercalation compound." It is noted that for the purposes of this patent application, any reference to intercalable compound may be replaced by intercalation compound, and vice-versa, since an intercalable compound must be capable of intercalating a guest species but may or may not actually contain the intercalated guest species.

"Intercalation" herein is not limited to the reversible inclusion or insertion of an atom, ion, or molecule sandwiched between layers present in a compound, which shall be referred to herein as "layer intercalation." Intercalation also includes absorption of neutral atoms or ionic species into a bulk phase of the compound, whether that phase is amorphous or crystalline; adsorption of neutral atoms or ionic species onto an outer surface or an internal surface (e.g., a phase boundary) present in the compound; and reversible chemical bonding between the neutral atoms or ionic species, and the compound.

Some embodiments of the invention utilize layer intercalation, in which a guest species such as potassium (K) expands the van der Waals gap between sheets of a layered compound such as graphite. This layer expansion requires energy. Electrical energy may be supplied to cause a chemical potential change at the interface with the intercalable compound, which then causes layer expansion.

In some embodiments, the intercalable compound is a carbonaceous material, such as a material selected from the group consisting of graphite, graphene, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

The carbonaceous material may be at least 50 wt % carbon, preferably at least 75 wt % carbon, more preferably at least 90 wt % carbon, most preferably at least 95 wt % carbon. In some embodiments, the carbonaceous material is essentially pure carbon, except for impurities. The carbonaceous material may include mesoporous carbon, microporous carbon, nanoporous carbon, or a combination thereof.

The intercalable compound may be a form of predominately $sp^2$ bonded carbon. Examples of $sp^2$ bonded carbon include, but are not limited to, graphite, graphene, carbon nanotubes, carbon fibers, fullerenes (e.g. $C_{60}$ or $C_{70}$), pyrolyzed carbon-containing molecules or polymers (such as pyrolyzed parylene, e.g. parylene-N, parylene-C, or parylene-AF-4), and large polyaromatic hydrocarbons (e.g. pentacene, rubrene, hexabenzocoronene, or coronene). In the case of graphene (which is essentially a single layer of graphite), the graphene may be monolayer graphene or multiple layers of graphene. Graphene flakes (a few layers of graphene) may be utilized. Certain embodiments utilize monolayer holey graphene, multiple layers of holey graphene, or graphene platelets.

In certain embodiments, the carbonaceous material comprises graphite. Graphite consists of planes of carbon sheets. Alkali atoms readily intercalate between these carbon sheets, leading to a high diffusivity for alkali atoms. Graphite electrodes enable fast alkali transport at low voltages and low power consumption per atom removed. Graphite transports not only atoms via intercalation, but also electricity due to the electron delocalization within the carbon layers. Valence electrons in the carbon are free to move, thereby conducting electricity through the graphite.

The graphite may be natural graphite (e.g., mined graphite) or synthetic graphite produced from various techniques. For example, graphite may be obtained from chemical-vapor-deposited graphitic carbon, carbide-derived graphite, recycled graphite, waste from graphene manufacture, and so on. Crystalline flake graphite occurs as isolated, flat, plate-like particles with hexagonal edges if unbroken; when broken the edges can be irregular or angular. Amorphous graphite is very fine flake graphite. Lump graphite occurs in fissure veins or fractures and appears as massive platy intergrowths of fibrous or acicular crystalline aggregates. Highly oriented pyrolytic graphite is graphite with an angular spread between the graphite sheets of less than 1°.

The graphite may be crystalline, amorphous, or a combination thereof. The graphite crystallinity may range from about 10% to about 90%, for example. A mixture of crystalline and amorphous graphite may be beneficial for intercalation not only between crystal layers but also between crystalline and amorphous regions of the graphite. With too much crystallinity, the diffusivity becomes highly anisotropic. If highly crystalline (i.e. highly anisotropic) graphite is oriented with the low-diffusivity axis normal to the surface of the device (which is a typical orientation), reduced alkali flux, and thus reduced performance, would result.

Functionalized carbon, such as graphite oxide or graphene oxide, may be employed in the intercalable compound of the second electrode.

In other embodiments, the intercalable compound of the second electrode is a transition-metal oxide, a transition-metal dichalcogenide, or a combination thereof. The intercalable compound may also be a mixture of a carbonaceous material and a transition-metal oxide, or a mixture of a carbonaceous material and a transition-metal dichalcogenide, or a mixture of all of these materials. Specifically, the intercalable compound may be a metal dichalcogenide selected from $MoS_2$, $TaS_2$, $TiTe_2$, or any other transition metal dioxide, disulfide, diselenide, or ditelluride.

In some embodiments, the second electrode is fabricated from particles of an intercalable compound dispersed in a matrix. The matrix may be a polymer binder, such as polyvinylpyrrolidone, cellulose resin, fluoroelastomer, or polyacrylic. The polymer binder preferably has low outgassing potential and is compatible with ultra-high vacuum. Optionally, additives may be introduced into the matrix to increase the electrical conductivity of the second electrode. Such additives may be metals or small conductive carbon particles (e.g. Super-P® Conductive Carbon Black).

One or more of the second (back) electrodes may be in contact with a reservoir volume (which may be referred to as a reservoir region or an atom reservoir). The reservoir volume may be hermetically sealed or may be in fluid communication with a larger system. The larger system, for example, could be part of a high-vacuum system containing pumps, pressure/vacuum gauges, atom dispensers, getters, getter pumps, getter sources, pill sources, etc. The reservoir volume may contain metal atoms in a vapor phase, a solid phase, and/or a liquid phase. The reservoir overcomes the problem of a loss of metal atom vapor over time, replacing atoms that irreversibly adsorb onto or diffuse into the walls, for example.

U.S. Pat. No. 10,056,913 entitled "VAPOR CELLS WITH ELECTRICAL CONTROL OF VAPOR PRESSURE, AND METHODS OF USING THE VAPOR CELLS" issued Aug. 21, 2018 (commonly owned with the present patent application) is hereby incorporated by reference herein for its disclosure about reservoir regions that may be utilized in the system of this invention, in certain embodiments.

The reservoir region should be capable of vapor isolation from the vapor-cell region. By "capable of vapor isolation" as intended herein, it is meant that the vapor-cell region and the reservoir region can be configured such that vapor cannot freely flow (by convection, diffusion, or ballistic transport, e.g. Knudsen diffusion, referred to herein individually or collectively as "vapor communication") between the vapor-cell region and the reservoir region. In some embodiments, a reservoir region is designed such that it is not ever in vapor communication with the vapor-cell region-unless there is some sort of leak or structural damage to the system. In certain embodiments, a closable valve is placed between the vapor-cell region and the reservoir region. In such embodiments, when the valve is optionally opened, the vapor-cell region and the reservoir region will temporarily be in vapor communication. However, the valve (if present) is normally closed, making the reservoir region in vapor isolation from the vapor-cell region.

In some embodiments, the concentration of metal atoms in the reservoir region is greater than that of the vapor-cell region. In these or other embodiments, the volume of the reservoir region is smaller than that of the vapor-cell region. The total number of metal atoms in the reservoir region may be larger or smaller than the total number of metal atoms in the vapor-cell region.

Walls enclose the reservoir region, sealing it from the ambient environment. The walls may be fabricated from silicon, $SiO_2$, fused silica, quartz, pyrex, metals, dielectrics, or a combination thereof, for example. Optionally, at least one of the walls includes a substantially transparent portion such that there is an optical path through the reservoir region.

The atom reservoir may be contained within an oven which can control the temperature of the atom reservoir. In some embodiments, the vapor-cell region is contained in an oven while the reservoir region is not, or is contained in a different thermal zone. In other embodiments, the reservoir region is contained in an oven while the vapor-cell region is not.

In some embodiments, a second ionic conductor is connected between either the vapor cell and the ambient or the reservoir and the ambient. There are two electrodes associated with this second ionic conductor, one on each side. This second ionic conductor may be used to load metal atoms into the vapor-cell region or into the reservoir region. The loading operation may be done at the beginning of the life of the vapor-cell system. The loading operation may be repeated periodically throughout operation of the vapor-cell system. This loading operation is easier than loading a precise amount of metal vapor into an unsealed vapor cell and then sealing the vapor cell. An impermeable (or reduced permeability) layer may be placed over the ionic conductor after loading to eliminate or reduce the diffusion of metal vapor out of the vapor-cell region and/or out of the reservoir region.

In some embodiments, the system further comprises an additional ionic conductor disposed between the vapor-cell region and an external source of metal atoms, for initial or periodic loading of the vapor-cell region. In these or other embodiments, the system may include another ionic conductor disposed between the reservoir region and an external source of metal atoms, for initial or periodic loading of the reservoir region with metal atoms. The polarity of the voltage may be selected to control direction metal atom flux, either from the reservoir region into the vapor-cell region, or from the vapor-cell region into the reservoir region. The amplitude of the voltage may be selected to control magnitude of metal atom flux.

The system may include a membrane which deflects as the pressure inside the vapor cell changes. The deflection could be read out with an electrical signal (e.g. piezoelectric, capacitive, differential capacitive, etc.). The membrane could deflect as the pressure between the vapor cell and a reference cell changes. The reference cell may contain vacuum or may contain a substance in vapor-solid or vapor-liquid equilibrium such that the pressure inside the reference cell would be known by knowing the temperature of the reference cell.

The system may be configured to allow a secondary optical path through the reservoir region. Multiple laser beams may be employed, or the beam of a single laser may be split to interrogate both the primary and secondary optical paths. The difference in absorption between the two paths may be used to sense the difference in metal atom vapor pressure between the two chambers. If the metal atoms in the reservoir are in a vapor-liquid or solid-vapor equilibrium, then the vapor pressure in the reservoir is known if the temperature of the reservoir is known. Thus, the vapor pressure in the vapor cell may be determined by knowing the difference in absorption between the two optical paths and the temperature of the reservoir.

Some variations of the invention provide methods for operating a device described herein. Some methods include the following steps or configurations.

In some embodiments, a heater is utilized to heat a region of the solid ionic conductor near the first electrode. A voltage is applied between the first and second electrodes to reduce the atom vapor density in a vapor-cell region (e.g., evacuate some or all of the alkali atoms from a vapor cell). The voltage is applied such the second electrode has a lower electrical potential than the first electrode. This causes mobile ions within the solid electrolyte to conduct towards the second electrode and mobile ions within the first electrode to conduct towards and into the solid electrolyte. At the interface between the solid electrolyte and the vapor chamber volume, adsorbed alkali atoms are ionized, electrons conduct through the first electrode, and ions conduct through the first electrode. As atoms from the vapor chamber volume adsorb onto the solid electrolyte, those atoms are continuously transported into the first electrode, thus reducing the number of atoms in the vapor phase in the vapor-cell region.

If the second electrode contains an intercalable compound, ions from the solid electrolyte will be neutralized by electrons supplied via the second electrode and the neutral atoms will intercalate into the second electrode material. If there is a reservoir with an atom vapor, ions from the solid electrolyte will be neutralized by electrons supplied via the second electrode, and neutral atoms will desorb from the surface of the ion-conducting layer into the alkali reservoir.

Some embodiments include one or more of the following additional steps or configurations.

A population of cold atoms (e.g., $10^5$ to $10^9$ atoms) at a temperature of, for example, about 1 µK to 1000 µK, may be prepared within a vapor-cell region prior to applying a voltage between the first and second electrodes to reduce the atom vapor density in the vapor-cell region. This population may be formed with a magneto-optical trap.

The response time (for sourcing and/or sinking metal atoms) of the system is preferably less than about 10 seconds, more preferably less than about 1 second, and most preferably less than about 0.1 second. In various embodiments, the system response time is about 1, 0.5, 0.2, 0.1, 0.05, 0.04, 0.03, 0.02, or 0.01 seconds.

The system power input for sourcing and/or sinking metal atoms is preferably less than about 500 mW, more preferably less than about 200 mW, and most preferably less than about 100 mW. In various embodiments, the system power input for sourcing and/or sinking metal atoms is about 500 mW, 400 mW, 300 mW, 200 mW, 100 mW, 75 mW, 50 mW, 25 mW, or 10 mW, or less.

A voltage (e.g., from about 0.01 V to about 100 V) may be applied between the first and second electrodes to increase the atom vapor density in a vapor-cell region prior to preparing a population of cold atoms within the vapor-cell region. In various embodiments, the applied voltage is about 10 mV, 25 mV, 50 mV, 100 mV, 200 mV, 300 mV, 400 mV, or 450 mV, or about 0.5 V, 1 V, 5 V, 10 V, 20 V, 50 V, 75 V, or 100 V. The voltage is applied such the second electrode has a higher electrical potential than the first electrode. This causes mobile ions within the solid electrolyte to conduct towards and into the first electrode. Additionally, ions will be conducted in the first electrode towards the interface between the first electrode and the vapor chamber volume. Ions from the first electrode will be neutralized by electrons supplied via the first electrode at the interface between the first electrode and the vapor chamber volume, forming neutral atoms. The neutral atoms will then desorb from the surface of the first electrode into the vapor-cell region, thus increasing the atomic density in the vapor-cell region.

If there is a solid source of replacement ions, the replacement ions will enter the ion-conducting layer near the second electrode and prevent the formation of an ion-depletion region. If an ion-blocking electrode is present, then within the solid electrolyte near the second electrode a region partially or fully depleted in mobile ions will form. Immobile ions (e.g. Al—O—$^-$ or $O^{2-}$) will remain. These immobile ions will form a pseudocapacitor balanced by the charge on the second electrode. These charges are physically separated. Metal ion flow will reduce and may eventually stop as more and more of the applied voltage drops across the pseudocapacitor region to maintain the charge separation.

If there is a reservoir with atom vapor and the second electrode does not contain an intercalable material, then metal atoms will adsorb on the ion-conducting layer and/or the second electrode, ionize, and then the metal ions will enter the ion-conducting layer and replace the lost ions. If the second electrode contains an intercalable compound, atoms will diffuse down a concentration gradient in the second electrode away from the interface between the second electrode and the reservoir region, and towards the ion-conducting layer. Atoms will ionize at the interface of the second electrode and ion-conducting layer. Electrons will conduct through the electrode, and ions will conduct through the ion-conducting layer. As atoms diffuse away from the interface between the second electrode and the reservoir region, the intercalable compound will getter additional atoms from the vapor phase.

Figure 11:
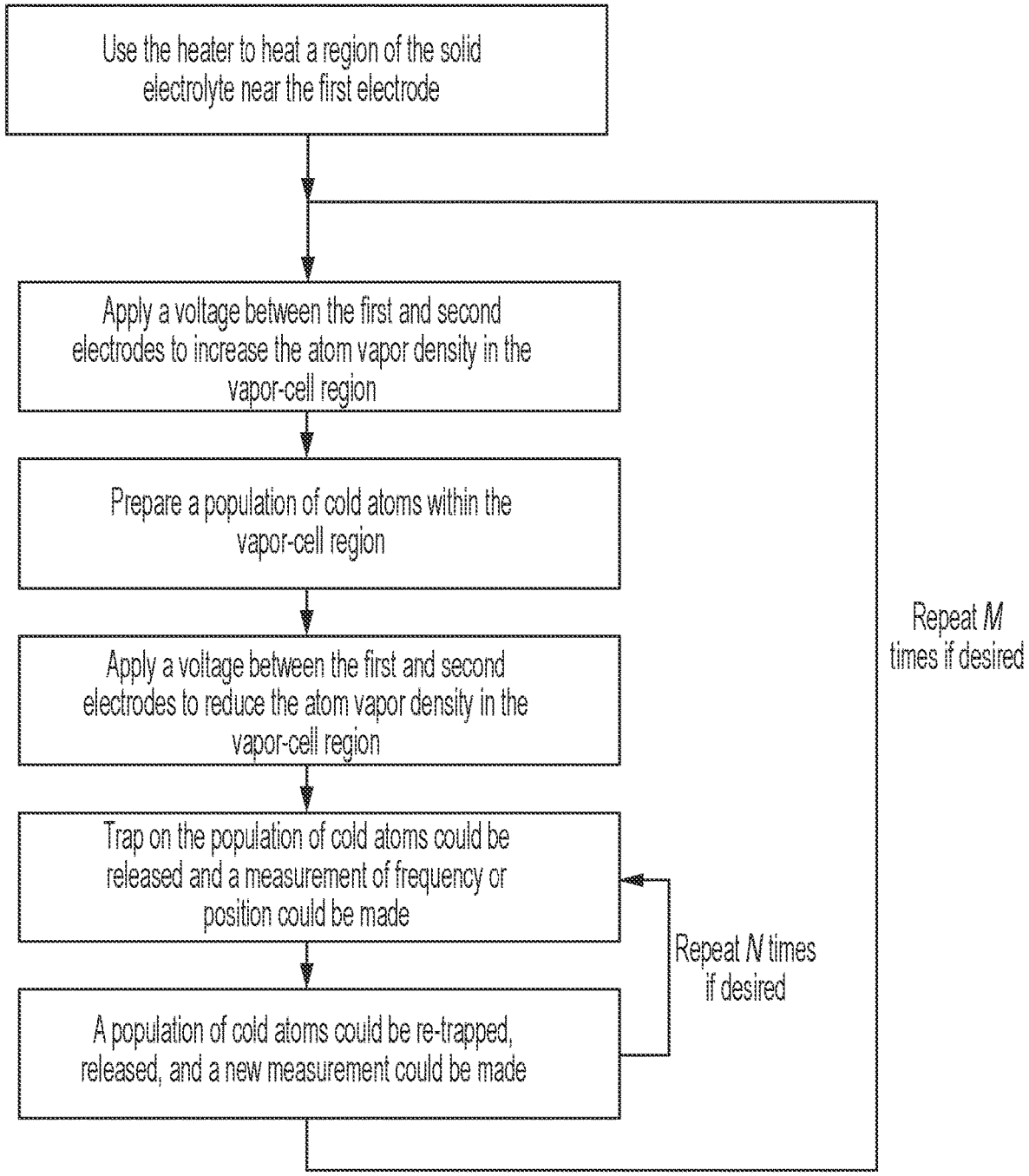
FIG. 11 is an exemplary flowchart of a method in some variations of the invention.

After reducing the vapor pressure as described above, the trap on the population of cold atoms may be released and a measurement of frequency or position may be made. After the measurement, a population of cold atoms may be re-trapped, released, and a new measurement may be made. This step may be repeated multiple times. The entire cycle of steps could be repeated multiple times. FIG. 11 is an exemplary flowchart of a method in some variations.

Some variations provide a method of operating an atom vapor-density control system, the method comprising:
(a) providing an atom vapor-density control system including (i) a first electrode; (ii) a second electrode that is electrically isolated from the first electrode; (iii) an ion-conducting layer interposed between the first electrode and the second electrode, wherein the ion-conducting layer is in ionic communication with the second electrode; (iv) at least one atom reservoir in ionic communication with the ion-conducting layer, wherein the atom reservoir is electrochemically configured to controllably supply or receive atoms; (v) a heater in thermal communication with a heated region comprising the first electrode; and (vi) one or more thermal isolation structures configured to minimize heat loss out of the heated region into a cold region;
(b) providing an atom-vapor apparatus selected from the group consisting of a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, and an atom dispenser system, wherein the atom-vapor apparatus is configured with the atom vapor-density control system;

(c) with the heater, heating the heating region of the atom vapor-density control system; and (d) applying a voltage between the first electrode and the second electrode, thereby adjusting atom vapor density within the atom-vapor apparatus.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

This specification incorporates by reference U.S. Pat. No. 10,056,913, issued Aug. 21, 2018; U.S. Pat. No. 9,763,314, issued Sep. 12, 2017; U.S. Pat. No. 9,837,177, issued Dec. 5, 2017; U.S. patent application Ser. No. 15/639,391, filed Jun. 30, 2017; and U.S. patent application Ser. No. 15/837,346, filed Dec. 11, 2017, each commonly owned with the present patent application.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An atom vapor-density control system, said system comprising:
    a first electrode;
    a second electrode that is electrically isolated from said first electrode;
    an ion-conducting layer interposed between said first electrode and said second electrode, wherein said ion-conducting layer is in ionic communication with said second electrode;
    at least one atom reservoir in ionic communication with said ion-conducting layer, wherein said atom reservoir is electrochemically configured to controllably supply or receive atoms;
    a heater in thermal communication with a heated region comprising said first electrode; and
    one or more thermal isolation structures, wherein said one or more thermal isolation structures are configured as insulation to retain heat within said heated region and minimize heat loss out of said heated region and into a cold region, wherein said thermal isolation structures include at least one solid beam that isolates said heated region from said cold region, and wherein said thermal isolation structures are characterized by an average thermal resistance of at least 100 K/W.

2. The atom vapor-density control system of claim 1, wherein said ion-conducting layer is ionically conductive for at least one ionic species selected from the group consisting of $Rb^+$, $Cs^+$, $Ca^{2+}$, $Na^+$, $K^+$, $Sr^{2+}$, and $Yb^{3+}$.

3. The atom vapor-density control system of claim 1, wherein said ion-conducting layer comprises a material selected from the group consisting of β-alumina, β"-alumina, and combinations thereof.

4. The atom vapor-density control system of claim 1, wherein said atom reservoir is in contact with said second electrode.

5. The atom vapor-density control system of claim 1, wherein said atom reservoir contains an intercalable compound.

6. The atom vapor-density control system of claim 1, wherein said heated region further comprises said second electrode.

7. The atom vapor-density control system of claim 1, wherein said heated region further comprises at least a portion of said ion-conducting layer.

8. The atom vapor-density control system of claim 1, wherein said heater is a thin-film resistive heater.

9. The atom vapor-density control system of claim 1, wherein said thermal isolation structures are characterized by an average thermal resistance of at least 1000 K/W.

10. The atom vapor-density control system of claim 1, wherein at least one of said thermal isolation structures is integrated into said ion-conducting layer.

11. The atom vapor-density control system of claim 1, wherein at least one of said thermal isolation structures forms a wall of said atom reservoir.

12. The atom vapor-density control system of claim 1, wherein said atom vapor-density control system is disposed within a vapor-cell system comprising a vapor-cell region configured to allow at least one optical path into a vapor phase within said vapor-cell region.

13. A method of operating an atom vapor-density control system, said method comprising:
    (a) providing an atom vapor-density control system including (i) a first electrode; (ii) a second electrode that is electrically isolated from said first electrode; (iii) an ion-conducting layer interposed between said first electrode and said second electrode, wherein said ion-conducting layer is in ionic communication with said second electrode; (iv) at least one atom reservoir in ionic communication with said ion-conducting layer, wherein said atom reservoir is electrochemically configured to controllably supply or receive atoms; (v) a heater in thermal communication with a heated region comprising said first electrode; and (vi) one or more thermal isolation structures, wherein said one or more thermal isolation structures are configured as insulation to retain heat within said heated region and minimize heat loss out of said heated region and into a cold region, wherein said thermal isolation structures include at least one solid beam that isolates said heated region from said cold region, and wherein said thermal isolation structures are characterized by an average thermal resistance of at least 100 K/W;
    (b) providing an atom-vapor apparatus selected from the group consisting of a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, and an atom dispenser system, wherein said atom-vapor apparatus is configured with said atom vapor-density control system;

(c) with said heater, heating said heating region of said atom vapor-density control system; and (d) applying a voltage between said first electrode and said second electrode, thereby adjusting atom vapor density within said atom-vapor apparatus.

14. The method of claim 13, wherein said thermal isolation structures are characterized by an average thermal resistance of at least 1000 K/W.

15. The method of claim 13, wherein said thermal isolation structures contain a material selected from the group consisting of $\beta$-alumina, $\beta''$-alumina, $\alpha$-alumina, silica, quartz, borosilicate glass, silicon, silicon nitride, silicon carbide, mica, polyimide, and combinations thereof.

16. The method of claim 13, wherein said ion-conducting layer is ionically conductive for at least one ionic species selected from the group consisting of $Rb^+$, $Cs^+$, $Ca^{2+}$, $Na^+$, $K^+$, $Sr^{2+}$, and $Yb^{3+}$.

17. The method of claim 13, wherein said atom reservoir is in contact with said second electrode.

18. The method of claim 13, wherein said heated region further comprises said second electrode.

19. The method of claim 13, wherein said heated region further comprises at least a portion of said ion-conducting layer.

20. The method of claim 13, wherein at least one of said thermal isolation structures is integrated into said ion-conducting layer.

* * * * *